US010701677B2

(12) United States Patent
Park et al.

(10) Patent No.: US 10,701,677 B2
(45) Date of Patent: Jun. 30, 2020

(54) METHOD AND APPARATUS FOR UPLINK RESOURCE ASSIGNMENT FOR CELLULAR NETWORK USING UNLICENSED BANDS

(71) Applicant: Samsung Electronics Co., Ltd., Suwon-si, Gyeonggi-do (KR)

(72) Inventors: Seunghoon Park, Seoul (KR);
Jungmin Moon, Suwon-si (KR);
Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 15/592,441

(22) Filed: May 11, 2017

(65) Prior Publication Data

US 2017/0332358 A1   Nov. 16, 2017

Related U.S. Application Data

(60) Provisional application No. 62/335,326, filed on May 12, 2016.

(51) Int. Cl.
*H04W 72/04* (2009.01)
*H04W 72/12* (2009.01)
(Continued)

(52) U.S. Cl.
CPC ......... *H04W 72/042* (2013.01); *H04L 1/1671* (2013.01); *H04L 1/1861* (2013.01);
(Continued)

(58) Field of Classification Search
CPC ........... H04W 72/042; H04W 72/1289; H04W 72/0446; H04W 74/0816; H04W 74/0808; H04L 1/1671; H04L 1/1861
See application file for complete search history.

(56) References Cited

U.S. PATENT DOCUMENTS

| 5,535,429 A | * | 7/1996 | Bergenlid | ............. | H04W 76/30 455/507 |
| 2005/0286408 A1 | * | 12/2005 | Jin | ........................ | H04L 5/0048 370/208 |

(Continued)

FOREIGN PATENT DOCUMENTS

WO   2014098701 A1   6/2014

OTHER PUBLICATIONS

ZTE Microelectronics Technology et al.,"Discussion on UL Scheduling for LAA," R1-162322, 3GPP TSG RAN WG1 Meeting #84bis, Apr. 1, 2016.

(Continued)

*Primary Examiner* — Hassan Kizou
*Assistant Examiner* — Hector Reyes
(74) *Attorney, Agent, or Firm* — Jefferson IP Law, LLP

(57) ABSTRACT

A communication technique of fusing a 5th-generation (5G) communication for supporting higher data transmission rate beyond a 4th-generation (4G) system with an Internet of things (IoT) technology and a system thereof are provided. The present disclosure may be used for an intelligent service (for example, a smart home, a smart building, a smart city, a smart car or a connected car, health care, digital education, retail business, security and safety related service, or the like) based on the 5G communication technology and the IoT related technology. A communication method of a base station includes generating resource assignment information of an uplink burst including at least two consecutive uplink subframes of an unlicensed band; transmitting the resource assignment information to a terminal; and receiving uplink data from the terminal during the at least two consecutive uplink subframes.

15 Claims, 22 Drawing Sheets

(51) Int. Cl.
 H04L 1/16 (2006.01)
 H04L 1/18 (2006.01)
 H04W 74/08 (2009.01)
(52) U.S. Cl.
 CPC ... *H04W 72/0446* (2013.01); *H04W 72/1289* (2013.01); *H04W 74/0816* (2013.01); *H04W 74/0808* (2013.01)

(56) References Cited

U.S. PATENT DOCUMENTS

| | | | |
|---|---|---|---|
| 2009/0207798 A1* | 8/2009 | Shan | H04W 72/042 370/329 |
| 2009/0262671 A1* | 10/2009 | Seol | H04W 72/0413 370/281 |
| 2011/0026546 A1* | 2/2011 | Zubow | H04L 5/0007 370/480 |
| 2014/0177487 A1 | 6/2014 | Hammarwall et al. | |
| 2015/0215097 A1* | 7/2015 | Yi | H04W 52/48 370/329 |
| 2015/0282210 A1* | 10/2015 | Li | H04W 76/14 455/436 |
| 2016/0095134 A1 | 3/2016 | Chen et al. | |
| 2016/0127098 A1* | 5/2016 | Ng | H04L 5/0048 370/329 |
| 2017/0223675 A1* | 8/2017 | Dinan | H04W 72/042 |
| 2017/0325225 A1* | 11/2017 | Dinan | H04W 72/0446 |
| 2018/0070367 A1* | 3/2018 | Fujishiro | H04W 72/12 |

OTHER PUBLICATIONS

NEC, "Discussion on multiple-subframe scheduling for LAA," R1-162442, 3GPP TSG RAN WG1 Meeting #84bis, Busan, Korea, Apr. 1, 2016.

LG Electronics, "Multi-subframe scheduling in LAA," R1-162466, 3GPP TSG RAN WG1 meeting #84bis, Busan, Korea, Apr. 2, 2016.

Nokia Networks et al., "On LAA PUSCH scheduling and UL grant enhancements," R1-160788, 3GPP TSG RAN WG1 Meeting, St.Julian's, Malta, Feb. 5, 2016.

* cited by examiner

METHOD AND APPARATUS FOR UPLINK RESOURCE ASSIGNMENT FOR CELLULAR NETWORK USING UNLICENSED BANDS

CROSS-REFERENCE TO RELATED APPLICATION(S)

This application claims the benefit under 35 U.S.C. § 119(e) of a U.S. Provisional application filed on May 12, 2016 in the U.S. Patent and Trademark Office and assigned Ser. No. 62/335,326, the entire disclosure of which is hereby incorporated by reference.

TECHNICAL FIELD

The present disclosure relates to a method and apparatus for assigning an uplink resource for an unlicensed band in a system sharing resources for device to device communications.

BACKGROUND

To meet a demand for radio data traffic that is on an increasing trend since commercialization of a 4th-generation (4G) communication system, efforts to develop an improved 5th-generation (5G) communication system or a pre-5G communication system have been conducted. For this reason, the 5G communication system or the pre-5G communication system is called a beyond 4G network communication system or a post long term evolution (LTE) system.

To achieve a high data transmission rate, the 5G communication system is considered to be implemented in a super high frequency (mmWave) band (e.g., like 60 GHz band). To relieve a path loss of a radio wave and increase a transfer distance of a radio wave in the mmWave band, in the 5G communication system, technologies such as beamforming, massive multi-input multi-output (massive MIMO), full dimensional MIMO (FD-MIMO), an array antenna, analog beamforming, and a large scale antenna have been discussed.

Further, to improve a network of the system, in the 5G communication system, technologies such as an evolved small cell, an advanced small cell, a cloud radio access network (cloud RAN), an ultra-dense network, device to device communication (D2D), wireless backhaul, a moving network, cooperative communication, coordinated multi-points (CoMP), and interference cancellation have been developed.

In addition, in the 5G system, hybrid frequency shift keying (FSK) and quadrature amplitude modulation (QAM) modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolved to an Internet of things (IoT) network that transmits and receives information between distributed components such as things and processes the information, in a human-centered connection network on which human generates and consumes information. The Internet of everything (IoE) technology in which the big data processing technology, etc., by connection with a cloud server, etc., is combined with the IoT technology has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been studied. In the IoT environment, an intelligent Internet technology service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology with various industries.

Therefore, various tries to apply the 5G communication system to the IoT network have been conducted. For example, the 5G communication technologies such as the sensor network, the M2M, the MTC have been implemented by schemes such as the beamforming, the MIMO, the array antenna, or the like. The application of the cloud RAN as the big data processing technology described above may also be considered as an example of the fusing of the 5G technology with the IoT technology.

The 5G system has considered a support for various services compared to the existing 4G system. For example, the most representative services are an enhanced mobile broadband (eMBB) communication service, an ultra-reliable and low latency communication (URLLC) service, a massive machine type communication (mMTC) service, an evolved multimedia broadcast/multicast service (eMBMS), etc. Further, a system providing the URLLC service may be referred to as an URLLC system, a system providing the eMBB service may be referred to as an eMBB system, and a system providing the mMTC service may be referred to as an mMTC system, and the like. In addition, the terms "service and system" may be interchangeably used with each other.

The above information is presented as background information only to assist with understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting and receiving a signal in a communication system.

Another aspect of the present disclosure is to provide a method and an apparatus for controlling physical channel parameters of a communication link in a system sharing communication resources.

Another aspect of the present disclosure is to provide a method and an apparatus for assigning a resource for a cellular network sharing resources in an unlicensed band.

Another aspect of the present disclosure is to provide a method and an apparatus for assigning a resource for relieving a problem of a delay increase and a signaling load increase due to a listen before talk (LBT) failure in an unlicensed band.

Another aspect of the present disclosure is to provide a method and an apparatus for minimizing a loss and more effectively using a frequency band for cellular communications in a shared band.

In accordance with an aspect of the present disclosure, a communication method of a base station is provided. The communication method includes generating resource assignment information of an uplink burst including at least two consecutive uplink subframes transmittable and receivable through an unlicensed band, transmitting the resource assignment information to a terminal, and receiving an uplink data from the terminal during the at least two consecutive uplink subframes.

The resource assignment information may include the information of the at least two uplink burst.

The resource assignment information may include information of the number of uplink bursts and the number of uplink subframes included in each uplink burst.

The resource assignment information may include information of a set of the uplink bursts in which the at least two uplink bursts are consecutive.

In accordance with an aspect of the present disclosure, a communication method of a terminal is provided. The communication method includes receiving resource assignment information including information indicating at least two consecutive uplink subframes transmittable and receivable through an unlicensed band from a base station, determining whether at least one of the at least two consecutive uplink subframes is occupied, and transmitting an uplink data to the base station during the at least one uplink subframe if it is determined that the at least one uplink subframe is occupied.

In accordance with an aspect of the present disclosure, a base station is provided. The base station includes a transceiver configured to transmit and receive a signal, and at least one processor configured to generate resource assignment information including information of an uplink burst including at least two consecutive uplink subframes transmittable and receivable through an unlicensed band, transmit the resource assignment information to a terminal, and receive an uplink data from the terminal during the at least two consecutive uplink subframes.

In accordance with an aspect of the present disclosure, a terminal is provided. The terminal includes a transceiver configured to transmit and receive a signal, and at least one processor configured to receive from a base station the resource assignment information including information indicating at least two consecutive uplink subframes transmittable and receivable through an unlicensed band, check whether at least one of the at least two consecutive uplink subframes is occupied, and transmit an uplink data to the base station during the at least one uplink subframe if it is determined that the at least one uplink subframe is occupied.

According to an embodiment of the present disclosure, it is possible to provide the method and apparatus for controlling physical channel parameters of a communication link in a system sharing communication resources.

Also, according to an embodiment of the present disclosure, it is possible to provide the method and apparatus for assigning a resource for a cellular network sharing resources in an unlicensed band.

Further, according to one embodiment of the present disclosure, it is possible to provide the method and apparatus for assigning a resource for relieving a problem of a delay increase and a signaling load increase due to a LBT failure in an unlicensed band.

In addition, according to an embodiment of the present disclosure, it is possible to provide the method and apparatus for minimizing a loss and more effectively using a frequency band for cellular communications in a shared band.

Objects aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that liked references numbers are used to depict the same or similar elements, features, and structures.

DETAILED DESCRIPTION

Figure 1:
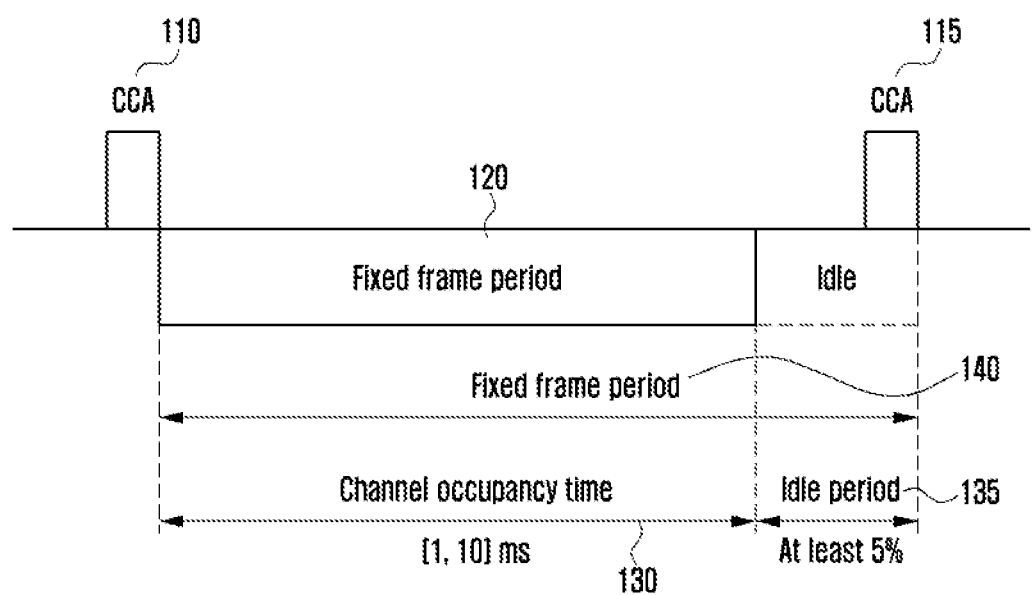
FIG. 1 is a diagram illustrating an example of a communication procedure through an unlicensed band in the case of frame based equipment (FBE) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components are exaggerated, omitted, or schematically illustrated in the accompanying drawings. Further, the size of each component does not exactly reflect its real size. In each drawing, the same or corresponding components are denoted by the same reference numerals.

Further, it may be understood that each block of processing flowcharts and combinations of flowcharts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flowcharts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flowcharts. Since the computer program instructions may also be mounted on the computer or the other programmable data processing apparatuses, the instructions performing a series of operation operations on the computer or the other programmable data processing apparatuses to create processes executed by the computer to thereby execute the computer or the other programmable data processing apparatuses may also provide operations for performing the functions described in block(s) of the flowcharts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Herein, the term '~unit' used in the present embodiment means software or hardware components such as a field-programmable gate array (FPGA) and an application specific integrated circuit (ASIC) and is responsible for any role. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may further be separated into additional components and '~units'. In addition, the components and the '~units' may also be implemented to reproduce one or more CPUs within a device or a security multimedia card.

In describing specific embodiments of the present disclosure in detail, a wireless communication system having a particular channel structure will be mainly described, but the subject matter to be claimed in the present specification may be also applied to other communication systems and service having the similar technical backgrounds as long as it does not depart from the scope and spirit of the present specification, which may be made by the determination of a person having ordinary skill in the art to which the present disclosure pertains.

Prior to a description of embodiments of the present disclosure, an example of an interpretable meaning for some terms used herein is provided. However, it should be noted that the present disclosure is not limited to the interpretation examples given below.

A base station (BS) which is a subject communicating with a terminal may be referred to as a BS, a base transceiver station (BTS), a node B (NB), an evolved NB (eNB, eNodeB), an access point (AP), a 5th-generation (5G) NB (gNB), or the like. In particular, at least one of the following embodiments of the present disclosure may be implemented in a heterogeneous network (HetNet) made up of a primary base station and an auxiliary base station, in which the primary base station may be referred to as a macro BS, a primary BS, a primary cell (PCell), or the like and the auxiliary base station may be referred to as a small BS, a secondary BS, a secondary cell (SCell), or the like.

User equipment (UE) which is one subject communicating with a base station may be referred to as a UE, a device, a mobile station (MS), mobile equipment (ME), a terminal, etc.

In order to improve the speed and capacity of the long term evolution (LTE) network with the development of the LTE, improved technologies such as LTE in unlicensed spectrum (LTE-U) using a shared band are being studied. The LTE-U or the licensed-assisted access (LAA) means a technology of integrating not only licensed bands used for the existing LTE communications but also licensed spectra or licensed bands and unlicensed spectra an unlicensed bands using carrier aggregation (CA). Accordingly, it is possible to support quality of service (QoS) and smooth mobility by using a more stable licensed band as an anchor to process all control signals and signaling. In addition, it is possible to give users with more improved mobile broadband experience by ensuring a boarder data pipe by extension to the unlicensed band.

Since the unlicensed band is a shared band that may be used by any technologies and devices, most countries specify transmission regulations to use the unlicensed band. In order to reduce device to device interference in the unlicensed band, transmit power of devices using the unlicensed band may be limited to a level lower than that of the licensed band.

The transmission regulations for shared bands such as a license-exempt band or the unlicensed band provide various schemes for relieving the device to device signal interference. As an example, the schemes may include a scheme of limiting transmit power so that receive power at a certain distance is not equal to or greater than a predetermined value, a scheme of hopping locations on time or frequency resources, a scheme of using only a certain resource among the entire resources, a scheme of first hearing signals from other devices and then restrictively performing a transmission only when receive power of the signal is smaller than a predetermined value, or the like.

The existing cellular communications such as the LTE requires a channel measurement for adaptively determining transmission capacity of a transmitting/receiving link and a resource assignment procedure based on link adaptation. However, there may be problems in applying the existing resource assignment schemes in the shared bands such as the unlicensed band where rules for coexistence between different communication systems are established. Therefore, there is a need for a new resource assignment scheme for communications using an unlicensed band.

Meanwhile, in a HetNet, the terminal may transmit and receive main system information (SI) and a control signal and may communicate mobility-sensitive traffic like a sound with the PCell and communicate traffic like data, which makes much of instantaneous transmission amount, with the SCell. Here, the Pcell may be set as the licensed band, and the SCell may be set as the shared band, that is, the unlicensed band. An example of the type of cellular communication system may include the LAA system. A terminal that additionally uses the shared band may be referred to as an LAA terminal and a terminal that uses only the existing licensed band may be referred to as an LTE terminal.

A terminal in a base station area may be in a radio resource control (RRC) idle state or an RRC connected state. The two states will be described below.

RRC IDLE: The RRC idle state is a state in which the terminal selects the base station (or cell), monitors a paging channel, and acquires SI but does not communicate data with the base station. It is considered that the terminal is camped in the corresponding base station.

RRC CONNECTED: The RRC connected state is a state in which the terminal monitors a control channel and communicates data with the base station through a data channel. It is a state in which the terminal reports various measurement results of the base station and neighbor base stations to help scheduling of the base station. The terminal is served with a service from the corresponding base station. Further, the corresponding base station is referred to as a serving cell for a serving terminal.

Equipment using the unlicensed band is classified into frame based equipment (FBE) or load based equipment (LBE). Hereinafter, a communication procedure by each equipment will be described.

FIG. 1 is a diagram showing an example of a communication procedure through an unlicensed band in the case of FBE according to an embodiment of the present disclosure.

Referring to FIG. 1, in the case of FBE, a transmitter needs to perform clear channel assessment (CCA) 110 above at least 20 micro seconds (μs) prior to performing a transmission 120 over an unlicensed band. The CCA 110 performs an operation of determining, by a transmitter, a magnitude of interference to determine whether another equipment currently uses an unlicensed band. The transmitter does not perform a transmission if it is determined as a result of the CCA 110 that the measured magnitude of interference is equal to or greater than a predetermined value, but performs the transmission 120 if it is determined as a result of the CCA 110 that the measured magnitude of interference is less than the predetermined value. At this point, the transmission 120 has a fixed frame period 140 and starts a start point of a frame immediately following a CCA period. If the transmitter performs the CCA 110 once, the transmitter may occupy an unlicensed band from at least 1 ms up to 10 ms and should be idle during an idle period 135 without performing the transmission for at least 5% of channel occupancy time (COT) 130. If it is determined as the performance result of the CCA 110 of the transmitter that another equipment currently uses an unlicensed band, the transmitter may pass through the fixed frame period 140 and then perform the CCA 115 again.

Figure 2:
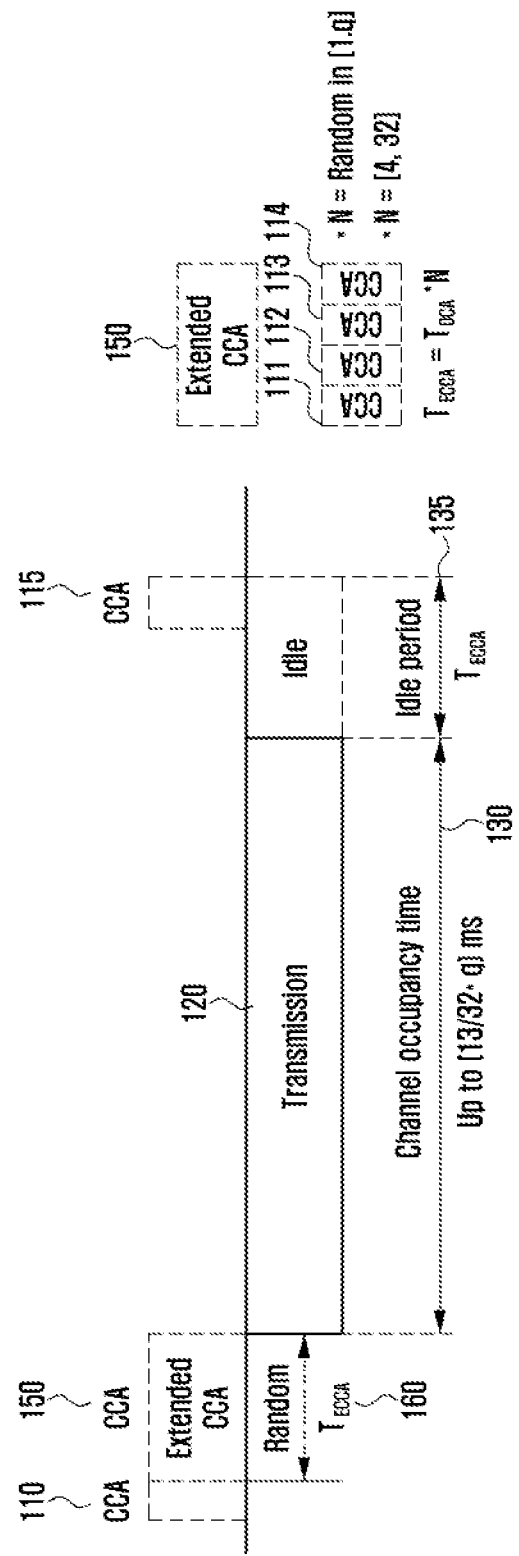
FIG. 2 is a diagram illustrating an example of a communication procedure through an unlicensed band in the case of load based equipment (LBE) according to an embodiment of the present disclosure.

FIG. 2 is a diagram showing an example of a communication procedure through an unlicensed band in the case of LBE according to an embodiment of the present disclosure.

Referring to FIG. 2, like the FBE, in the case of LBE, the transmitter performs the CCA 110 for at least 20 μs prior to performing the transmission 120 through the unlicensed band. If it is determined as the performance result of the CCA 110 that there is no equipment currently using the unlicensed band, the transmitter may perform the transmission 120. However, if it is determined that another equipment is currently using the unlicensed band, unlike the FBE, the LBE may perform an additional CCA that is referred to as extended CCA (ECCA) 150. The ECCA 150 consists of N CCAs 111, 112, 113, and 114, in which N is a backoff counter value ($T_{ECCA}$) 160 arbitrarily selected between [1, q] and q represents a contention window size (CWS). The CWS q may be given by the base station or may be determined by the terminal. FIG. 2 illustrates the case where N is 4, in which N may be smaller or larger than 4. An N CCA counter is decremented each time one of the CCAs 111, 112, 113, and 114 succeeds. If the CCA counter detects a band occupancy before it reaches 0, a freezing operation waiting until the band occupancy is resolved while the CCA counter is stored is performed. If it is detected that band use is possible again, an operation of decreasing the CCA counter restarts again. When the CCA counter reaches 0, if it is determined that there is no equipment currently using an unlicensed band, the transmitter performs the transmission 120 after the last CCA interval. That is, if it is determined as the performance result of the ECCA 150 that there is no equipment currently using the unlicensed band, the transmitter may perform the transmission 120. At this point, the time when the transmitter may occupy the unlicensed band, that is, the COT 130, is up to $(13/32)*q$ ms and then the CCA 115 may be performed again and the transmitter has the idle period 135 for the time when the ECCA is performed.

Meanwhile, the FBE and the LBE each have advantages and disadvantages. First, the performance of the LBE will show better than that of the FBE, in view of the occupancy probability of the unlicensed band. This is because the FBE may not perform the CCA again for a fixed frame period 140 if the CCA 110 fails once but the LBE may take an operation to occupy the unlicensed band by performing the ECCA 150, that is, an additional CCA (111, 112, 113, and 114) N times after the CCA 110 fails.

Next, there is an advantage that the FBE is simpler than the LBE in view of the scheduling, that is, the transmission of the control channel. The FBE may use the unlicensed band based on a subframe boundary, that is, control channel (PDCCH) transmission time point. However, since the LBE arbitrarily selects N which is the CCA performance frequency of the ECCA 150, the use start time point of the unlicensed band may not match the subframe boundary. Therefore, the LBE reserves a part of a first subframe and performs a transmission of a control channel and a data channel from a second subframe.

In addition, the FBE does less damage to neighboring Wi-Fi devices sharing an unlicensed band, compared to the LBE. Generally, the LBE is more likely to occupy the unlicensed band than the FBE. This is because the Wi-Fi device is taking more chances to occupy the unlicensed band. In the 3GPP standard, the FBE scheme is referred to as CAT2 LBT and the LBE scheme is referred to as CAT4 LBT.

Meanwhile, in order to provide a reliable cellular communication service in the mobile environment even if an unlicensed band is used, the terminal needs a scheme for maintaining an access to a licensed band. Therefore, delay-sensitive services such as voice may be transmitted in the licensed band, and data services may be transmitted using the licensed band and opportunistically, may be transmitted using the unlicensed band, thereby improving the data transmission rate as much as possible.

Figure 3:
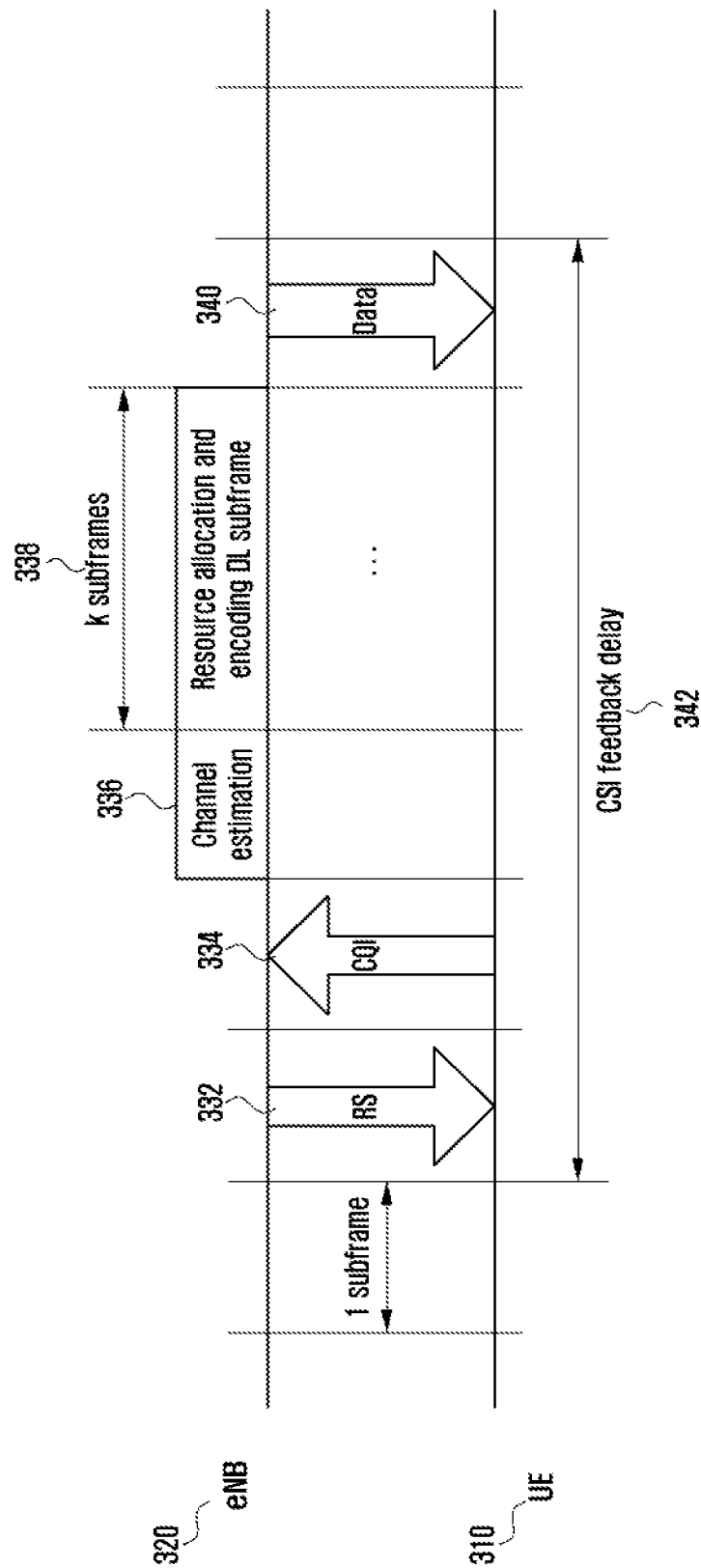
FIG. 3 is a diagram illustrating a procedure for determining transmission capacity of a transmitting/receiving link in a wireless communication system according to an embodiment of the present disclosure.

FIG. 3 is a diagram illustrating a procedure for determining transmission capacity of a transmitting/receiving link in a wireless communication system according to an embodiment of the present disclosure.

Referring to FIG. 3, in a downlink, a terminal 310 measures a reference signal (RS) 332 of a base station 320 and carries a signal quality of the RS on a channel quality indicator (CQI) 334 and report it to the base station 320. The RS 332 of the base station 320 may consist of a common/cell-specific reference signal (CRS) or a channel state information-reference signal (CSI-RS) commonly given to all terminals 310 within a service area of the base station 320 or a UE-specific RS given only to a specific terminal 310. The terminal 310 may be controlled by the base station 320 to periodically or aperiodically report the CQI 334 indicating channel quality to the base station 320. The terminal 310 may use a physical uplink control channel (PUCCH) for the periodic report and a physical uplink shared channel (PUSCH) for the aperiodic report.

According to an embodiment, the CRS may be replaced with a synchronization signal (SS).

The base station 320 may perform scheduling for determining to which one of the terminals 310 physical resource blocks are assigned based on the CQI 334 that the terminal 310 reports and notify (336, 338) the scheduled terminals 310 of assignment information for each terminal as the scheduled result. Resource assignment signals (or referred to as uplink (UL) grant/downlink (DL) grant) signal indicating an assigned downlink resource location and resource assignment information (e.g., physical channel parameters such as modulation and coding scheme (MCS) index and hybrid automatic repeat request (HARQ) related information) may be scrambled with identification of the terminal 310, for example, a cell radio network temporary identity (C-RNTI) or an M-RNTI (mobile broadcast service (MBMS) RNTI) and may be transmitted through a physical downlink control channel (PDCCH). The terminal 310 receiving the resource assignment signal may receive (downlink data 340 on a physical downlink shared channel (PDSCH) through the physical resource blocks notified by the resource assignment signal.

In case of the uplink, the base station 320 may measure the RS from the terminal 310 and know the quality of the uplink signal. The RS of the terminal 310 may use a sounding reference signal (SRS) that the base station 320 periodically assigns (about 2 to 320 ms) to a specific UE. Even if it differs from the current standard, a demodulation reference signal (DMRS) that the terminal 310 transmits together with the uplink data may be used for the uplink measurement of the unlicensed band for the operation in the shared band. The base station 320 performs the uplink scheduling for determining to which one of the terminals 310 the physical resource blocks are assigned based on the CQI obtained by measuring the RS that the terminal 310 transmits and notifies the scheduled terminals 310 of the assignment information for each terminal as the scheduling result. The resource assignment signal indicating the assigned uplink resource is scrambled with the identification of the terminal 310 and transmitted through the PDCCH, and the terminal 310 receiving the resource assignment signal may transmit the uplink data on a PUSCH through the physical resource blocks notified by the resource assignment signal.

For the base station 320 to complete the channel measurement and the link adaptation for the terminal 310, a predetermined delay time is taken due to the transmission and reception and processing of required signals. For example, reviewing the operation of the downlink illustrated in FIG. 3, the terminal 310 measures the RS 332 (e.g., CRS) that the base station 320 transmits every downlink subframe, and two subframes are required to report the CQI 334, by the terminal 310, through the physical uplink control channels (PUCCHs) assigned to each uplink subframe. The base station 320 requires one subframe for channel estimation 336, and requires one to k subframes 338 according to implementation of scheduling for determining the resource assignment and the MCS index. Therefore, a minimum allowable CQI feedback delay 342 may be 4 ms.

Since the minimum period of the SRS in the uplink is 2 subframes, the uplink more generates one subframe delay than the downlink, and thus the CQI feedback delay is at least 5 ms. The longer the SRS period, the longer the overall CQI feedback delay.

In the unlicensed band, since the terminal 310 performs the LBT prior to transmitting the uplink signal and performs the transmission when the result is successful (i.e., channel is empty), the transmission failure probability is higher than the existing licensed band. To overcome the above problems, a scheme for assigning a redundant resource is required. Also, there is a need to design an appropriate resource assignment scheme differently depending on data or a control signal.

In the embodiments described below, a resource assignment scheme for minimizing a loss will be described in consideration of the three problems described above.

That is, since it is difficult to perform the periodic channel measurement, the terminal 310 may perform the CQI report based on the channel measurement value after the base station 320 successfully performs the LBT and occupies the channel. For this, the base station 320 may assign to the terminal 310 resources of subframes that are temporally close to each other.

A delay of at least 4 ms in the downlink and a delay of at least 5 ms in the downlink may occur even if the aperiodic channel measurement is assumed. For example, therefore, in the case of the downlink, the CQI measured in the first subframe may be reflected to the scheduling only when the COT is greater than at least 4 ms. As a result, since the base station 320 may not perform the correct CQI based MCS determination on four subframes for the first 4 ms, the base station may select a complementary MCS index for the subframes.

In addition, if the terminal 310 fails to perform the LBT, that is, if a channel busy is detected, the terminal 310 needs to receive the resource assignment from the base station 320 again. At this time, a delay of 7 ms may occur in order of a scheduling request (SR), an interval of 3 ms, UL grant, an interval of 4 ms, and a data transmission. Therefore, if it is determined that an LBT failure rate is high, the base station 320 may assign resources for consecutive subframes by one-time grant.

Figure 4:
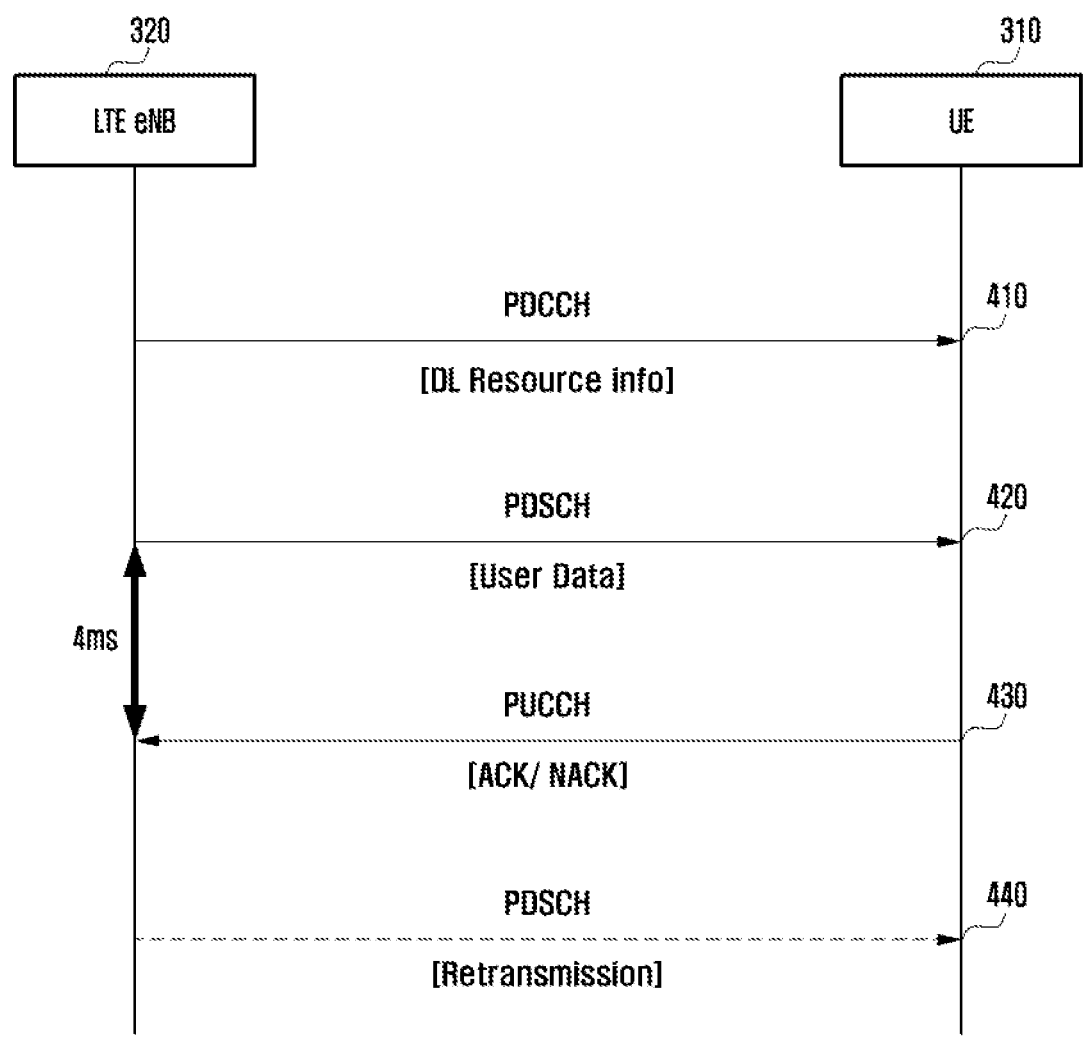
FIG. 4 is a diagram illustrating an example of a downlink scheduling procedure according to an embodiment of the present disclosure.

FIG. 4 is a diagram illustrating an example of a downlink scheduling procedure according to an embodiment of the present disclosure.

Referring to FIG. 4, in operation 410, the base station (eNB) 320 transmits the physical channel parameters (e.g., MCS index or the like) assigned by the scheduling and the downlink resource information (DL resource information) indicating the assigned resources to the terminal (UE) through the PDCCH. In operation 420, the base station 320 may transmit user data to the terminal 310 through the PDSCH on the physical resource blocks indicated by the downlink resource information. In operation 430, the terminal 310 may transmit to the base station 320 acknowledgment (ACK)/non-ACK (NACK) that is a HARQ response to the user data. At this point, a delay of 4 ms may occur between the user data of the downlink and the ACK/NACK. If the HARQ response in the operation 430 is the NACK, in operation 440, the base station 320 may retransmit the user data to the terminal 310.

Figure 5:
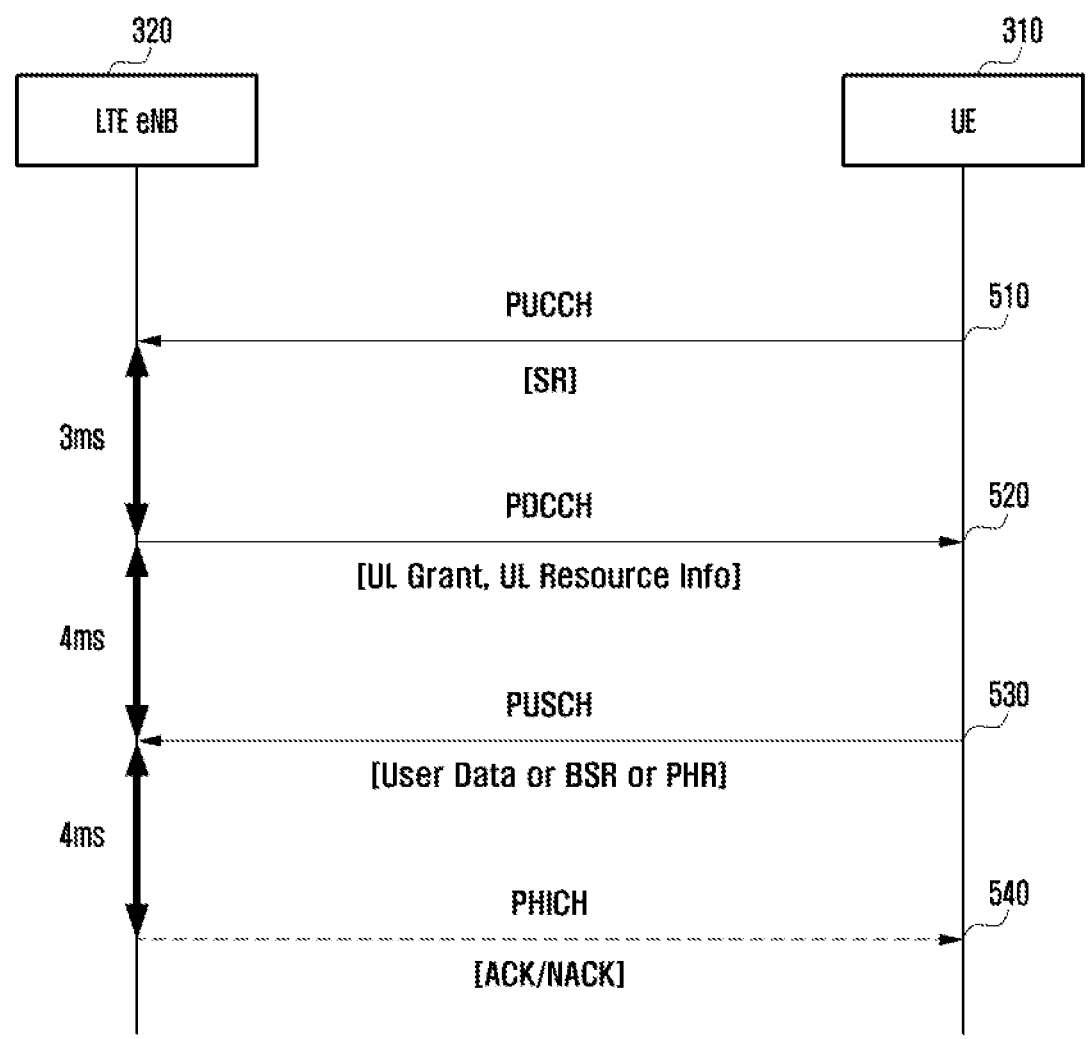
FIG. 5 is a diagram illustrating an example of an uplink scheduling procedure according to an embodiment of the present disclosure.

FIG. 5 is a diagram illustrating an example of an uplink scheduling procedure according to an embodiment of the present disclosure.

Referring to FIG. 5, in operation 510, the terminal 310 having the user data or the control information to be transmitted to the uplink may transmit the SR to the base station 320 through the PUCCH. The base station 320 performs the scheduling in response to the SR, and in operation 520, may transmit the uplink grant according to the scheduling, that is the uplink resource information, to the terminal 310 through the PDCCH. The scheduling may take, for example, 3 ms. In operation 530, the terminal 310 may transmit the user data, a buffer status report (BSR), a power headroom report (PHR) or the like through the PUSCH on the physical resource block indicated by the uplink resource information. In this case, it may take 4 ms to prepare the uplink transmission through the PUSCH. In operation 540, the base station 320 may transmit the ACK/NACK for the uplink reception through the PUSCH to the terminal 310 through a physical HARQ indication channel (PHICH). At this point, a delay of 4 ms may occur between the uplink transmission through the PUSCH and the ACK/NACK of the base station.

Therefore, a method according to an embodiment of the present disclosure is a method for assigning a resource in a cellular network using an unlicensed band. The method includes generating, by a base station, at least one resource assignment signal including information indicating a plurality of consecutive uplink subframes transmittable and receivable through an unlicensed band, transmitting the resource assignment signal to a terminal through the unlicensed band during at least one resource subframe, and receiving an uplink data from the terminal during the consecutive uplink subframes.

Further, a method according to an embodiment of the present disclosure is a method for receiving resource assignment in a cellular network using an unlicensed band. The method includes receiving, by a terminal, at least one resource assignment signal including information indicating a plurality of consecutive uplink subframes transmittable and receivable through the unlicensed band from a base station during at least one downlink subframe, identifying the plurality of consecutive uplink subframes based on the resource assignment signal and other control signals, and transmitting uplink data to the base station during the consecutive uplink subframes.

Further, an apparatus according to an embodiment of the present disclosure includes a base station for assigning a resource in a cellular network using an unlicensed band. The base station includes at least one processor generating at least one resource assignment signal including information indicating a plurality of consecutive uplink subframes transmittable and receivable through the unlicensed band, and a transceiver transmitting the resource assignment signal to a terminal through the unlicensed band during at least one resource subframe and receiving uplink data from the terminal during the consecutive uplink subframes.

Further, an apparatus according to an embodiment of the present disclosure includes a terminal for receiving a resource assignment signal in a cellular network using an unlicensed band. The terminal includes a transceiver receiving at least one resource assignment signal including information indicating a plurality of consecutive uplink subframes transmittable and receivable through the unlicensed band from a base station during at least one downlink subframe and transmitting uplink data to the base station during the consecutive uplink subframes, and at least one processor identifying the plurality of consecutive uplink subframes based on the resource assignment signal and other control signals, and transmitting uplink data and notifying the transceiver of the identified subframes.

Further, an apparatus according to an embodiment of the present disclosure includes a terminal for receiving a resource assignment signal for transmission of a control signal in a cellular network using an unlicensed band. The terminal includes a transceiver receiving at least one resource assignment signal including information indicating a plurality of consecutive uplink subframes transmittable and receivable through the unlicensed band from a base station during at least one downlink subframe and transmitting an uplink control signal to the base station during the consecutive uplink subframes and at least one processor identifying the plurality of uplink subframes based on the resource assignment signal and other control signals, and transmitting uplink data and notifying the transceiver of the identified subframes.

Meanwhile, although the procedures, methods, and apparatuses of the present disclosure are described below with respect to the unlicensed band, they may be applied in the licensed band, the shared band, and the like without any restrictions.

Transmission of Uplink Control Signal

The base station 320 may assign a control channel or data channel resource in order to allow the terminal 310 to transmit the uplink control information (UCI). In case of the LTE, the base station 320 may transmit UCI to the terminal 310 through the PUCCH (uplink control channel) or may multiplex the UCI with data through the PUSCH (uplink shared channel) and transmit it to the terminal 310. As the method for assigning an uplink resource in the unlicensed band, there may be largely cross-carrier (CC) scheduling and self-carrier (SC) scheduling. According to the CC scheduling, the base station 320 may assign an uplink resource of an unlicensed band SCell2 through a downlink control channel in the PCell or the SCell1. According to the SC scheduling, the base station 320 may assign an uplink resource of the same SCell2 through a downlink control channel in the unlicensed SCell2.

In this case, if the PCell or the SCell1 is the licensed band, the CC scheduling is not affected by the LBT. However, if the PCell or the SCell1 is the unlicensed band, even the CC scheduling is affected by the LBT for the downlink control channel transmission. The SC scheduling is naturally affected by the LBT for the downlink control channel transmission. Therefore, if the downlink control channel is transmitted in the unlicensed band, the LBT having a high success rate needs to be applied to the uplink resource assigned to the terminal 310. In this case, the LBT having a high success rate means a case where CAT2 LBT (FBE) is used or a backoff counter or a contention window value of CAT4 LBT (LBE) is small.

Meanwhile, a delay of 4 ms is typically required between the UL grant and the UL data. This occurs because the terminal 310 receives an instruction from the base station 320, encodes a packet to be transmitted, or requires a calculation time to determine transmit power. Several advantages may be obtained by reducing the delay time between the UL grant and the UL data in the unlicensed band. First, when the LBT fails, the total delay taken until the terminal 310 receives the UL grant again and transmits data may be reduced. Further, the SC scheduling may reduce an empty period until the terminal 310 transmits resources after the base station 320 occupies the resources, thereby more efficiently using the resources.

Further, since the transmission period of various UL control information and UL data is set differently, there is a need to be able to support various resource assignment methods by a minimum possible UL grant overhead.

Meanwhile, in order to cope with the LBT failure in the unlicensed band, multi subframe scheduling capable of resource assignment for a plurality of UL subframes by one-time UL grant may be considered. This is mainly considered for the data transmission and may increase the success rate by assigning k consecutive UL subframes to allow the terminal 310 to perform the LBT on the k consecutive UL subframes. Further, the UCI information may be considered in a different scheme from data depending on its format.

For a channel state indication (CSI) report for the channel measurement result, a report period may be set in subframe units of {2, 5, 10, 20, 40, 80, 160, 32, 64, 128}. If the report period has a relatively smaller value, like data, a CSI report resource may be indicated by the UL grant but if the report period has a relatively larger value, it may exceed an area in which the UL grant may be indicated. Further, if the report period has a larger value, a strict report period that needs to be notified by the UL grant is not required. Therefore, if the report period is set by a higher layer message (e.g., RRC message) for the CSI report, it may be understood that the terminal 310 assigned at least one UL subframe by the UL grant in the set CSI [within the report period], [report period−delta, report period], [report period−delta, report period+delta], or [report period, report period+delta] and the terminal 310 performs the CSI report in the first UL subframe among them. The delta value may be set to a predetermined value or a preset ratio or may be set by the base station 320. The reason of setting the delta value is to reduce a burden of the base station 320 that should perform a blind detection on whether the terminal 310 transmits the CSI information or not at any location within the report period.

In the case of the existing licensed band, the PUCCH locations are fixed on a terminal-by-terminal basis, such that the terminal 310 may adequately report the CSI by the report period information. However, in the case of the unlicensed band, the terminal 310 may access resources at any time point and therefore to prevent report signals of different terminals from colliding with each other, an offset of the report period and a report resource period needs to be additionally set along with the report period. It is understood that the terminal 310 sets report resources at each report resource period from the set offset on, for example, SFN #0, and the terminal 310 may perform a one-time CSI report in a period divided depending on the report period. The report resource period may be set to be, for example, 5 ms, and the report period may be set to be, for example, 20 ms. Different terminals 310 may be assigned the report resources divided by the offset, the report resource period, and a resource block (RB). At this point, the RB may be set by the RRC message or dynamically by the UL grant.

Unlike the CSI report, the resource for the HARQ-ACK report is generally assigned to the PUCCH or the PUSCH of the UL subframe after 4 ms for DL data. By the way, since there is no guarantee that the LBT will succeed after 4 ms in the unlicensed band, redundant UL resources need to be assigned. At this point, the redundant UL resources may be further assigned to a time axis or a frequency (component carrier) axis. The base station 320 may assign resources for HARQ-ACK report to consecutive UL subframes, like the multi subframe UL grant method. If there are UL data, the base station 320 may control a UCI control signal including HARQ-ACK to be multiplexed with the UL data and transmitted.

Further, if the HARQ-ACK report resource is assigned to a plurality of UL subframes by the base station 320, it is preferable that HARQ-ACK report resource is assigned to all of the plurality of UL subframes indicated by the UL grant. If the HARQ-ACK is reported in a first succeeding UL subframe among the plurality of UL subframes, the terminal 310 needs to simultaneously perform an operation of configuring a signal having only the UL data in the subsequent UL subframe according to whether the LBT of the current UL subframe succeeds and an operation of configuring a signal obtained by multiplexing the HARQ-ACK with the UL data. However, if the HARQ-ACK resource is assigned to all of the plurality of UL subframes, resources are used inefficiently. Further, since a timing interval between the DL data and the HARQ-ACK is not fixed, the reception complexity of the base station 320 may be increased. To avoid this, a method of assigning a redundant UL subframe to a component carrier axis may be considered. For example, if the base station 320 sets a UCI cell group in the terminal 310, the terminal 310 transmits HARQ-ACK feedback from at least one of the SCells, which successfully perform the LBT, among the UL subframes for each SCell corresponding to HARQ-ACK timing defined within the UCI cell group. At this point, if the LBT succeeds in a plurality of SCells, 1) the terminal 310 may report the HARQ-ACK feedback in all the SCells. Further, 2) the terminal 310 may compress and report the HARQ-ACKs for a plurality of CCs in the SCell having the lowest SCell index. Further, 3) if all LBTs succeed at CC above the maximum concurrent transmission CC (e.g., three (or two or four or more)), the terminal 310 may report the HARQ-ACK only up to the maximum concurrent transmission CC while the SCell index is increased from CC having the lowest SCell index, for example. Further, for the SCell exceeding the maximum concurrent transmission CC, the transmission is not performed even if the LBT succeeds, it may be considered as discontinuous transmission (DTX) or LBT failure to be operated. Meanwhile, if the terminal 310 reports the plurality of HARQ-ACKs at any one of the CCs, the same format as the existing UCI format 3 accommodating the HARQ-ACK for the DL data of other CCs may be used.

As described above, the 4 ms delay between the UL grant and the UL data transmission may have a big effect on performance. Therefore, a scheme for reducing 4 ms delay will be described. The largest operation required for the terminal to receive the UL grant and prepare the UL data is to encode information bits and to determine transmit power. Therefore, if the base station 320 notifies the terminal 310 of the resource assignment information (transport block (TB) size, MCS, RB assignment, hopping, etc.) in advance, the terminal 310 may configure the transmission data in advance and respond to the fast UL grant of the base station 320 to reduce the delay between the UL grant and the UL data transmission. A transmit power control command is to progressively change transmit power, and therefore needs to be transmitted like every UL grant but may be controlled to use the same transmit power for a plurality of assigned subframes. For setting the resource assignment information in the terminal 310, the base station 320 may semi-statically transmit the RRC message including the resource assignment information to the terminal 310 or may dynamically transmit an uplink resource grant (UL resource grant) including the resource assignment information to the terminal 310. If the data to be transmitted is prepared, the terminal 310 previously receiving the resource assignment information may transmit the UL data having a short delay time (e.g., about 1 ms or the like) to a fast UL grant. Meanwhile, if the base station 320 starts to occupy resources by the CAT4 LBT, it may perform consecutive transmission and reception using a fast LBT within a maximum channel occupancy time (MCOT) period that is defined depending on traffic priority. That is, if the number of DL subframes and the number of UL subframes is included in the MCOT, the base station 320 or the terminal 310 may perform the fast LBT depending on the short CCA (e.g., 25 μs) or the small backoff (BO) counter value upon the transmission within the period.

In the operation of the base station 320 and the terminal 310 based on the resource assignment information and the fast UL grant, the following operations may be made depending on when the terminal 310 prepares a transmission packet and when the terminal 310 transmits a packet.

1) When the Fast UL Grant Includes Transmission Time Point:

After receiving a message (e.g., RRC message or UL resource grant) including resource assignment information, the terminal 310 may start to prepare a data packet to be transmitted to the base station 320 on the uplink. Further, after a delay time of at least 3 ms, the base station 320 may transmit a fast UL grant to the terminal 310. At this point, the base station 320 implicitly instructs the terminal 310 to use the fast UL grant to implicitly indicate a minimum delay (e.g., 1 ms), or explicitly assigns delay information of m subframe intervals by including the delay information in the fast UL grant.

In this case, the terminal 310 should be always prepared to transmit the next data packet immediately after completing a transmission of one data packet. Accordingly, if the terminal 310 is not prepared, for the base station 320 to transmit the fast UL grant to the terminal 310, the base station 320 may notify the terminal 310 of the number of TBs to be prepared in advance, in addition to the resource assignment information.

In addition, the method controls the transmission time point of each terminal by the UL fast grant. For preventing the collision of the LBT with each terminal and for coexistence with other systems, a method of notifying the same transmission time point to the UE group may be considered additionally. The C-RNTI may be shared or the N-RNTI may be assigned to indicate the UE group. The method may be applied to both consecutive assignment and discontinuous assignment. For example, in the case of the consecutive assignment, [0, 1, 2] or [0, 2] or [2] may be transmitted to indicate n+1, n+2, and n+3 from an n subframe in which the fast grant is transmitted. In the case of the discontinuous assignment, [0, 2, 4] may be transmitted to indicate n+1, n+3, and n+5 from the n subframe in which the fast UL grant is transmitted. As another method, [0, 1, 2], [0, 2], or [2] may be transmitted, but an inter-subframe interval may be indicated by a separate individual/common control signal. For example, if the inter-subframe interval is indicated by 2, [0, 1, 2] may be understood as n+1, n+3, and n+5.

Meanwhile, the terminal 310 may prepare an initial transmission packet in advance, but in the case of the uplink retransmission, the terminal may not prepare a retransmission packet in advance unless the base station 320 notifies the terminal 310 of the HARQ-ACK/NACK. In synchronous HARQ, the base station 320 may notify the terminal 310 of the HARQ-ACK/NACK through the physical Hybrid-ARQ indicator channel (PHICH) after 4 ms after transmitting the UL data. However, if the base station 320 does not transmit the PHICH to the licensed band, it is difficult to accurately keep the interval of 4 ms. The reason is that a resource access is stochastically defined depending on the success or failure of the LBT of the base station 320 in the unlicensed band. Further, the PHICH uses only a synchronous HARQ procedure in the uplink. In the unlicensed band, only the asynchronous HARQ procedure may be considered due to uncertainty of an uplink resource access. Therefore, the following schemes may be considered.

a) HARQ-ACK/NACK for Uplink:

The base station 320 may transmit separate HARQ-ACK information to the terminal 310, in addition to the UL grant. For example, if the UL data is assigned at locations n, n+1, . . . , n+k in k multi subframes, the base station 320 may transmit the HARQ-ACK to the terminal 310 at locations n+4, n+5, . . . , n+k+4 if the downlink LBT succeeds. In addition, if the base station successfully performs the downlink LBT, the base station 320 may transmit the HARQ-ACK even at locations n+k+5, n+k+6, . . . , n+2k+5. This generally corresponds to the case where locations of resources having m values at locations m+0, m+1, . . . m+k are repeated every n+4, n+4+k, . . . N+4+p*k. The base station 320 may perform the uplink operation at the corresponding location or excludes the situation where it does not secure the resource due to the failure of the LBT, secure the downlink subframe if the LBT succeeds, and immediately transmit the HARQ-ACK for the PUSCH transmission of the unlicensed band to the terminal 310 with the HARQ-ACK before the subsequent UL grant is transmitted.

b) Identification by NDI:

If the HARQ-ACK for the UL data is not fed back to the terminal 310, the terminal 310 is applied with the fast UL grant of about 1 ms for the initial transmission, but cannot but suffer from a general delay of 4 ms for the retransmission. In order to reduce the delay, the terminal 310 should prepare both the initial transmission and the retransmission packet but the complexity of the terminal 310 may be increased. If the terminal 310 identifies and transmits any one the initial transmission and the retransmission, the base station 320 may transmit the UL grant including the NDI information. The NDI information is generally transmitted in a toggling manner, compared to the previous NDI information. That is, if the previous NDI is 0, it is changed to 1 and if the previous NDI is 1, it is changed to 0 to notify that it is a new packet. Therefore, if the NDI is toggled for the same transmission time point information, for example, [0, 1, 2], that is, if the initial transmission is performed, the terminal 310 may transmit a packet that is being prepared in advance in n+1, N+2, and n+3 subframes, compared to the n subframe that is the UL grant reception time point. Conversely, if the NDI is not toggled, that is, if the retransmission is performed, the terminal 310 prepares a new retransmission packet and transmits it in n+4, n+5, and n+6 subframes. On the other hand, due to the interference among the causes of the retransmission, there may be the case where the base station 320 fails to receive the PUSCH but there may be the case where the terminal fails to perform the LBT. If the terminal 310 fails to perform the LBT, exceptionally, the fast UL grant is possible again. In order for the terminal 310 to identify the NDI, the base station 320 may 1) toggle the NDI in the UL grant but change a redundancy version (RV) to a value different from an RV value transmitted at the time of the initial transmission and transmit it, 2) transmit the RV redundancy at the same RV value as the previous value without toggling the NDI, or 3) transmit the RV redundancy so that a transmit power change value is 0 in a UL TPC command.

c) Identification by Transmission Time Point Information:

The base station 320 may indicate the initial transmission by [3, 4, 5] and the retransmission by [0, 1, 2] and indicate time point {n+4, n+5, n+6} and {n+1, n+2, n+3} compared to the UL grant time point (n). Alternatively, the fast delay transmission is indicated by [0, 1, 2], 0 and the general delay transmission is indicated by [0, 1, 2], 1 and thus the UL grant-UL data delay is identified by a last bit, such that compared to the UL grant time point (n), the time point {n+4, n+5, n+6} and the time point {n+1, n+2, n+3} may be indicated. In case of the identification by the transmission time point information, the proper UL grant may be combined with the NDI information to control the retransmission due to the initial transmission and the reception error, and the retransmission due to the LBT failure. For example, if the NDI is toggled and the fast delay transmission is performed, it may correspond to the initial transmission. If the NDI is not toggled and is the general delay transmission, it is the retransmission due to the reception error. If the NDI is not toggled and the fast delay transmission is performed, it may be the retransmission due to the LBT.

2) If Transmission Time Point is Included in Resource Assignment Information:

If the terminal 310 receives the resource assignment information (e.g., RRC message or UL resource grant) or a separate common control signal, the terminal 310 may additionally know the transmission time point (e.g., subframe timing, or the like) in addition to the TB size, the MCS, the RB assignment, and hopping. Further, the terminal 310 may start to prepare the data transmission 4 ms ahead of the scheduled nearest transmission time point. The advantage of the method is that if the transmission time point is set to be a long period, there is no need to perform the unnecessary processing and the use of the memory in advance. In addition, since periodically available resources are designated over a long period of time, there is no need to issue a separate UL grant for the retransmission. For example, if the scheduled transmission time point is set at an interval of 8 ms and the data generation delay of the terminal 310 is set to be 4 ms in the RRC configuration, the terminal 310 may be prepared to generate data in advance before 4 ms, compared to each transmission time point. If the fast UL grant of the base station 320 is received in 4 ms, the terminal 310 transmits the prepared data and if the fast UL grant is not received until the transmission time point, the terminal 310 may not perform the transmission at the transmission time point. Further, if the terminal 310 does not receive the fast UL grant for the scheduled transmission time point, that is, the subframe, the terminal 310 may consider the subframe as a downlink subframe and perform a signal reception operation of the base station 320.

In the LBT method for the UCI and the uplink data, intervals between a plurality of UL subframes may be set to be different from each other. For example, resources may be assigned in a t subframe period for the UCI transmission. On the other hand, resources may be assigned in a t' subframe for the data transmission. At this point, t may use a value equal to or greater than t'. For example, if t' is 1, the success rate of the data transmission may be increased. Meanwhile, in order to support both the UCI and the data by the common UL grant signal, the base station 320 may include the t subframe period based on the UL grant transmission/reception time point in the UL grant or notify the terminal 310 of the t subframe period based on SFN #0 by the RRC message in advance. Alternatively, if there is no separate t subframe period information in the UL grant, the terminal 310 may be operated in the t' subframe period for the data transmission all the times and then may be operated by being reckoned as the t subframe period if the control information transmission is indicated by the UL grant or a higher layer control signal. If the control signal is instructed to be transmitted as the higher layer control signal in a specific period, the uplink resource may be assigned at a k subframe period based on a first UL subframe indicated in the UL grant or the subframe in which the UL grant is transmitted and received.

If DL+UL MCOT is notified by a DL control signal (e.g., common DCI, etc.), the terminal 310 is operated by CAT2 LBT in the case where it is included in the DL+UL MCOT and by CAT4 LBT in the case where it is not included in the DL+UL MCOT. The terminal that has not received the DL+UL MCOT information is operated by a less aggressive CAT4 LBT for coexistence with WiFi.

The terminal 310 may be operated by a CAT2 LBT if it is assigned an UL grant for a short UL burst, for example, one UL subframe, and may be by the CAT4 LBT if it is assigned an UL grant for a long UL burst, for example, two or more UL subframes.

If the terminal 310 is set to try the transmission in two or more UL subframes in the UL burst and is set to try the transmission only in one of the two UL subframes, the terminal 310 may be operated by the CAT2 LBT and if the terminal 310 is set to try the transmission in two or more UL subframes, the terminal 310 may be operated by the CAT4 LBT.

In the multi subframe scheduling, if the retransmission resource is assigned in advance, the terminal 310 may shorten the delay until it receives the UL grant for the LBT failure again and transmits it.

Describing in detail the conditions of defining the LBT failure, there may be 1) if the LBT fails in all of the N multi subframes indicated in the UL grant of the multi subframe scheduling, and 2) if the LBT fails in all the plurality of UL resources in one carrier in a particular timer, 3) if the LBT fails in all the plurality of UL resources in a plurality of carriers within the particular timer, or the like.

UL subframe for retransmission only: The NDI is not indicated every UL subframe, and the base station 320 may set a location of UL subframe or UL burst for retransmission only by the higher layer control signal such as RRC at a specific time (e.g., offset, period, or the like) and/or a specific CC. In this case, the NDI for identifying the retransmission in the multi subframe UL grant need not be included every subframe. The base station 320 instructs the terminal 310 to transmit the retransmission data at the specific time and/or the specific CC when instructing the retransmission of the UL data that has failed to receive and the terminal 310 may transmit the retransmission packet instead of a new transmission if the information thereon matches each other.

Since PRACH and other UL signals have different transmission timings, other UL signals may lose transmission opportunities due to the PRACH signal during the LBT operation. Therefore, a method for transmitting PRACH immediately after DRS transmission time point without data is possible.

Based on the setting of the base station 320, the terminal 310 may use an LBT gap shorter than an LBT gap set for transmitting an HARQ initial transmission packet with respect to an HARQ retransmission packet. According to one embodiment, the length of the LBT gap may be set differently in inverse proportion to the number of retransmissions. In this case, the LBT gap may be set to be a length of one CCA slot in the case of the CAT2 LBT and may be set to be a size of the window that generates the backoff value in the case of the CAT4 LBT.

The terminal 310 may be set to use LBT gaps having different lengths depending on the distance from the base station 320 by the setting of the base station 320. For example, the terminal 310 that is far away from the base station 320 may use a short LBT gap and the terminal 310 that is close to the base station 320 may use a long LBT gap. In this case, the LBT gap may be set to be a length of one CCA slot in the case of the CAT2 LBT and may be set to be a size of the window that generates the backoff value in the case of the CAT4 LBT.

Based on the setting of the base station 320, the terminal 310 may not transmit but skip one UL resource (e.g., k subframe) due to the LBT failure among a plurality of UL subframes within UL burst assigned by the multi subframe scheduling and then may transmit the UL resource having the reduced size in the subsequent UL resource (k+1 subframe) according to the predetermined rule. Based on the setting of the base station 320, the first terminal #1 may apply a shorter LBT gap to transmit data delayed due to the LBT failure. At this time, the second terminal #2 assigned to the next subframe (i.e., k+1 subframe) which the first terminal wants to transmit may detect the UL signal from the first terminal #1 by the LBT and transmit data in the remaining UL resources having the reduced size according to the predetermined rule. For this operation, a TB assigned to the terminal 310 in one subframe may be made up of a plurality of partial coding blocks.

If a base station 320 uses a physical layer transmission scheme capable of simultaneously receiving UL signals of a plurality of terminals 310 from the same resource, that is, a non-orthogonal multiple access scheme, it may be combined well with grant-free or SPS transmission schemes that transmit resources without UL grant. The multi subframe scheduling scheme or the SPS-multi subframe scheduling scheme of the present disclosure may also be operated together with the non-orthogonal multiple access scheme. However, if the terminal 310 is operated in the licensed band, instead of the LBT, the terminal 310 may select and transmit one UL resource among a plurality of UL resources in one UL burst or may determine whether to retransmit the subsequent UL resource by receiving UE group common ACK/NACK of the base station 320 directly responding to the UL transmission in the same subframe. The UE group common NACK may be transmitted according to the following conditions in order for the base station 320 to instruct the terminal 310 to perform the retransmission. That is, if the UL signals of all the terminals 310 transmitted from the UL resource of the subframe are input having a predetermined value or greater and thus the reception of the base station 320 fails with respect to a predetermined number or more of terminals 310, the base station 320 may transmit the UE group common NACK signal. The terminal having the UE group common NACK signal from the base station 320, the terminal 310 may perform the retransmission in the next UL resource like the operation for the LBT failure. Further, the terminal 310 that has received the UE group common ACK signal or has received nothing from the base station 320 may consider that the transmission in the previous UL resource was successful.

[Uplink Multi Subframe Scheduling Method]

In the present disclosure, a multi subframe scheduling method for assigning a plurality of consecutive resources in the uplink is proposed. In this case, unlike the general multi subframe scheduling, according to an embodiment of the present disclosure, the multi subframe scheduling may be repeated at a fixed period in order to support a service characterized by periodic traffic patterns.

Semi-persistent scheduling (SPS) was supported for fixed period traffic according to the related art. The terminal 310 may receive configuration information to generate a TB to transmit such as an SPS resource period, RB assignment, and MCS as the RRC message from the network to an uplink shared channel (UL-SCH) and may be prepared to transmit the SPS. Further, for the SPS resource and the transmission information based on the SPS setting, the terminal 310 may transmit data if the UL buffer is not empty. On the other hand, if the UL buffer is empty, the terminal 310 may not transmit data in the activated SPS resource except for transmission of a PHR if the uplink SPS skip (SkipUplink-TxSPS) is set. If the UL buffer is empty, the terminal 310 pads the assigned SPS resource, that is, needs to transmit a zero medium access control (MAC) protocol data unit (PDU) if SkipUplinkTxSPS is not set. If the consecutive frequency of transmission of the implicitReleaseAfter counter value set by the RRC and the zero MAC PDU is equal, the terminal 310 may perform a release operation to clear the set an UL SPS resource. The release operation is necessary to prevent waste of the SPS resource. Since the SPS resource is periodically secured, waste occurs if the terminal 310 does not use the SPS resource. In order to minimize the waste, the base station 320 may instruct the terminal 310 to perform activation or release by the PDCCH. In the case of the release, an implicit or explicit method is possible. The case where the terminal 310 receives PDCCH SPS release is different from the case where the SPS setting is released by the RRC message, and the SPS setting still maintained. Therefore, the base station 320 may reactive the SPS setting of the terminal that has been released by the PDCCH SPS activation. According to one embodiment, the terminal 310 determines the SPS release and then transmit an SPS Confirmation MAC command element (CE) to the base station 320 by a first initial transmission packet assigned to check the release. The terminal 310 which transmits the SPS Confirmation MAC CE may delete the assigned SPS resource.

Meanwhile, the terminal 310 may perform one or a plurality of RRC configurations for the SPS multi subframe (MS) scheduling in one cell/carrier and one setting may include at least one information of a logical channel, a data resource bearer, numerology, and service. The terminal can transmit the UL data to be transmitted in association with at least one of the logical channel, the data resource bearer, the numerology, and the service in the assigned SPS-multi subframe resource based on the setting. The additional setting to be referred to by the terminal 310 in order to select what type of data the terminal 310 transmits in connection with the RRC configuration may be extended and applied to even the case where an additional dynamic UL grant is given together with the SPS-multi subframe, for example, in the case where the retransmission of the resource within the UL burst is assigned to a dynamic UL grant.

Figure 6:
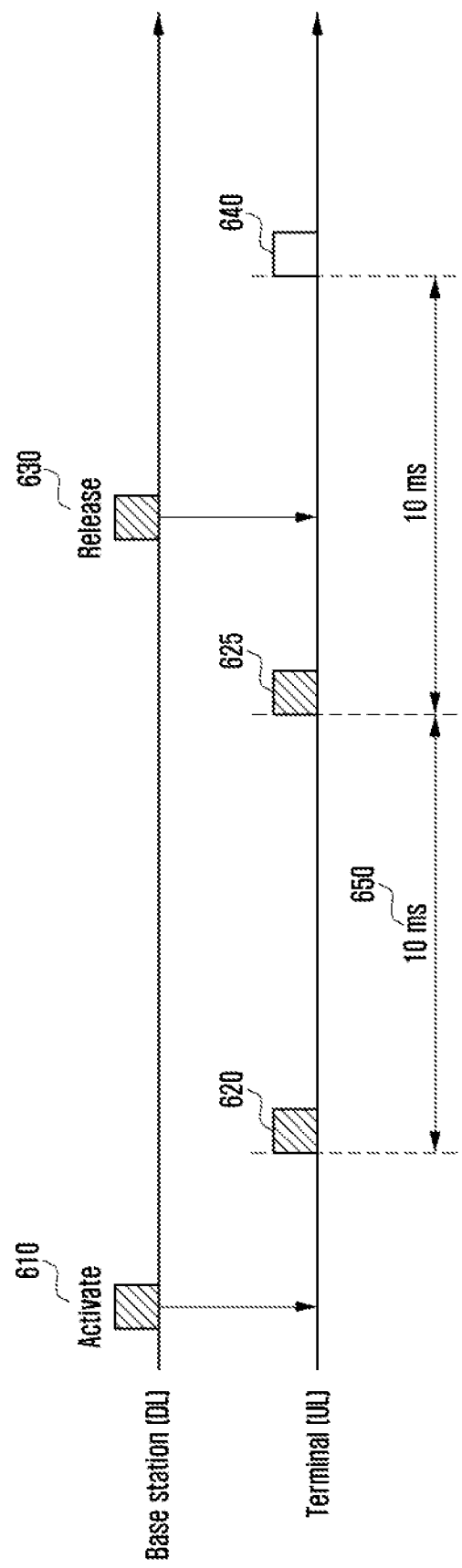
FIG. 6 is a diagram illustrating an example of semi-persistent scheduling (SPS) assignment according to an embodiment of the present disclosure.

FIG. 6 is a diagram showing an example of SPS assignment according to an embodiment of the present disclosure.

Referring to FIG. 6, the SPS in the case where an SPS period 650 is 10 ms. Further, the following drawing describes, by way of example, the case where the SPS period 650 is 10 ms, but the present embodiment is not limited thereto. Therefore, the SPS period 650 may be shorter or longer than 10 ms. The terminal 310 may apply the activation 610/release 630 from the earliest SPS resources 620 and 640 after receiving PDCCH SPS activation 610 or SPS release 630 message. The locations of the UL SPS resources 620, 625 and 640 are based on the following Equation using a system frame number (SFN), a subframe index, a UL SPS period (semiPersistSchedIntervalUL), and a subframe offset (Subframe_offset) as an input. At this time, the subframe offset is provided in the specification only when two SPS resources are assigned to one frame in the TDD frame structure, and is used to determine the SPS resource location depending on the subframe offset value for each TDD frame structure.

Figure 7:
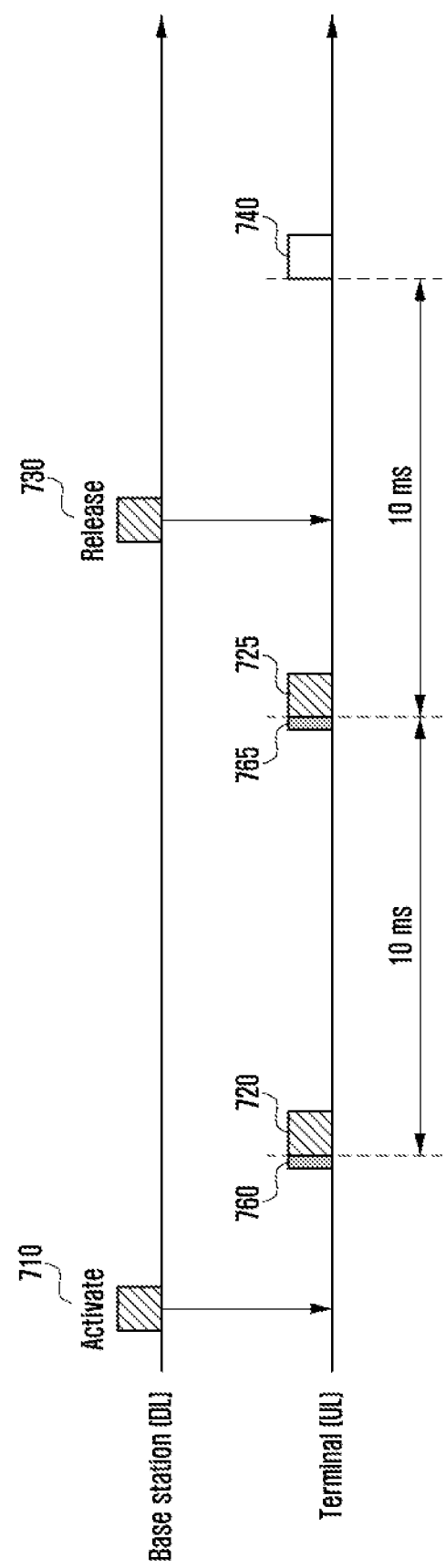
FIG. 7 is a diagram illustrating an example of an SPS assignment in an unlicensed band according to an embodiment of the present disclosure.

$(10*\text{SFN}+\text{subframe})=[(10*\text{SFN}_{start\ time}+\text{subframe}_{start\ time})+N*\text{semiPersistSchedIntervalUL}+\text{Subframe\_Offset}*(N\ \text{modulo}\ 2)]\ \text{modulo}\ 10240$ FIG. 7 is a diagram showing an example of SPS assignment in an unlicensed band according to an embodiment of the present disclosure.

Referring to FIG. 7, the base station 320 may instruct the terminal 310 to perform the general SPS setting and the transmission operation even in the unlicensed band. That is, the terminal 310 may apply activation 710/release 730 from the earliest SPS resources 720 and 740 after receiving PDCCH SPS activation 710 or SPS release 730 message. However, as illustrated in FIG. 7, the terminal 310 performs listen-before-talks (LBTs) 760 and 765 before each transmission in the SPS resources 720, 725, and 740 assigned to the unlicensed band and perform the transmission in the corresponding SPS resources 720 and 725 only when the LBTs 760 and 765 succeed. If the LBTs 760 and 765 fail, the terminal 310 waits until the next SPS resource or performs the retransmission if the base station 320 dynamically grants retransmission resources. This may cause delay problems due to the characteristics of the service using SPS.

Therefore, according to the present disclosure, when the consecutive SPS resources are further assigned in one SPS period, the terminal 310 tries to support a retry in other UL resources when the LBT fails in one UL resource.

Figure 8:
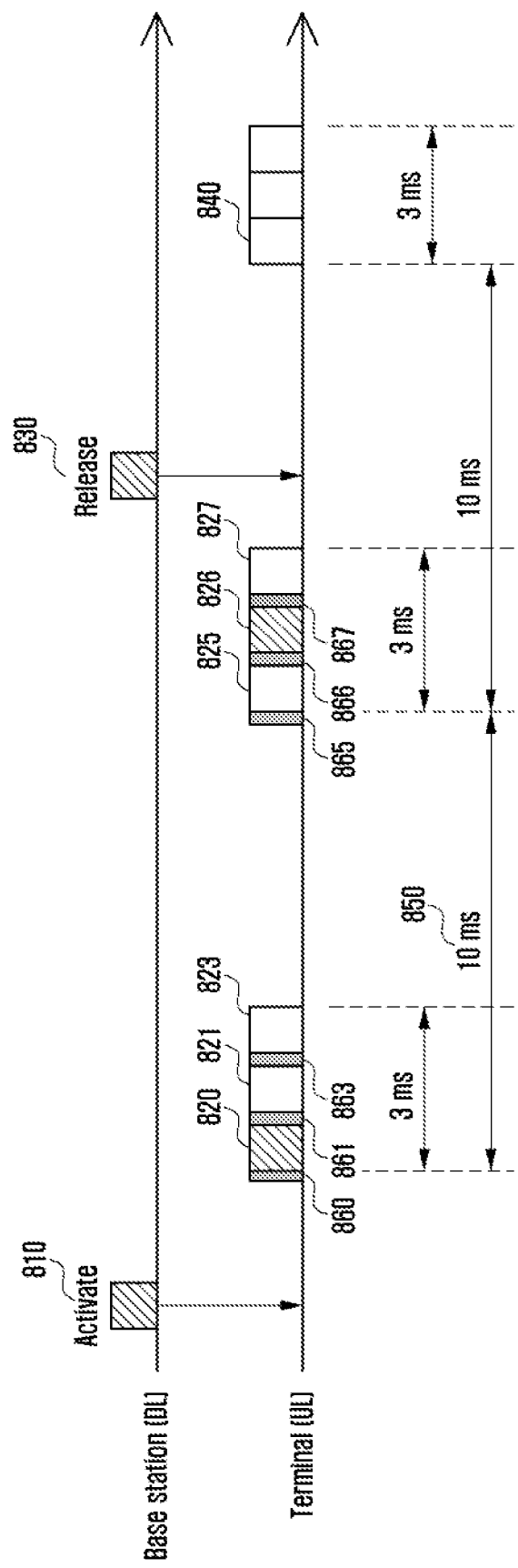
FIG. 8 is a diagram illustrating an example of an SPS assignment according to an embodiment of the present disclosure.

FIG. 8 is a diagram illustrating an example of SPS assignment according to an embodiment of the present disclosure.

Referring to FIG. 8, the base station 320 may add UL burst length information to the SPS configuration information of the RRC message and transmit the UL burst length information to the terminal 310 by changing the existing SPS setting scheme as small as possible. Further, the terminal 310 may set UL resources to be assigned to the length of the UL burst continued in each SPS period 850 based on the RRC SPS setting. The consecutive UL burst length may be represented by at least one of, for example, a subframe unit, a slot unit, a mini slot unit, a symbol unit, and the like. For example, in the case of FIG. 8, the UL burst length may be given by 3. Therefore, resources of three SPS UL subframes 820, 821, and 823 may be assigned.

Further, the terminal 310 may apply activation/release from the earliest SPS resources 820, 821, 823, 825, and 840 after receiving PDCCH SPS activation 810 or SPS release 830 message. In this case, if the terminal 310 receives the PDCCH SPS activation 810, the terminal 310 performs the LBT before the first SPS resource 860 of the UL burst assigned to the unlicensed band, and if the LBT 860 succeeds, may perform the transmission in the corresponding SPS resource 820. At this time, if the LBT 860 fails, the terminal 310 may try LBTs 861 and 863 in the subframes 821 and 823 corresponding to the consecutive UL burst length, and if the LBTs 861 and 863 succeed, may perform the transmission in the corresponding SPS resources 821 and 823. Further, if all of the LBTs 860, 861, and 863 in the first UL burst fail, the terminal 310 tries LBTs 865, 866, and 867 in the next SPS resources 825, 826, and 827 to perform the UL data transmission. FIG. 8 illustrates that the LBT 860 succeeds in the first SPS resource 860 of the first UL burst, and thus the terminal 310 transmits UL data, and the LBT 866 succeeds in the second SPS resource 866 of the second UL burst and thus the terminal 310 transmits UL data.

Meanwhile, in the first resource 820 of the UL burst, the terminal 310 may fetch data to be transmitted from the determined HARQ process according to the HARQ process ID determination method based on the existing SPS setting.

At this time, the HARQ process ID to be used in the SPS resource may be determined according to the following Equation.

HARQ Process ID=[floor(CURRENT_*TTI*/(semiPersistSchedIntervalDL+Subframe_Offset*($N$ modulo2)))] modulo numberOfConfSPS-Processes CURRENT_*TTI*=[(SFN*10)+subframe number]

Further, unlike the HARQ process ID to be used for the first SPS resource 820 of the UL burst, the HARQ process ID to be used for the other SPS resources 821 and 823 in the UL burst may have different determination methods according to the condition. For example, if the terminal 310 retries an initial transmission packet that is not transmitted due to the LBT 860 failure in the UL burst to the succeeding SPS resources 821 and 823, the terminal 310 may use the same HARQ process ID as the packet in which the previous LBT fails 1) all the times or 2) in accordance with the setting of the base station 320. Alternatively, the terminal 310 may use 3) the HARQ process ID that is continued to the HARQ process ID of the packet in which the previous LBT fails and is not used yet, based on the setting of the base station, may use 4) the smallest or largest ID among the HARQ process IDs not yet used depending on the setting of the base station 320, or may use 5) an ID obtained by the HARQ process ID determination method for the initial transmission.

According to one embodiment, the terminal 310 needs to transmit the SPS Confirmation MAC CE to the base station 320 after the SPS release. However, if the SPS activation and SPS release operations happen, it may be wasteful for the terminal 310 to use the SPS resource to transmit the SPS Confirmation MAC CE. Alternatively, like streaming, a service whose period is constant but traffic size varies needs to be supported. Alternatively, the UL burst length should be adaptively controlled according to the congestion of the surrounding channels. In order to satisfy the above requirements, a method for dynamically setting, by the base station 320, SPS resource assignment may be required. The base station signal for the dynamic additional setting may have an identifier or an expression format to be identified from a general dynamic UL grant signal. In addition, if there are a plurality of SPS resource assignments, an additional dynamic UL grant signal may include the identifier for identifying the SPS setting. The terminal 310 may identify whether the UL grant signal is different from the normal UL grant based on the identifier, or identify an additional UL grant for a certain SPS setting.

Figure 9:
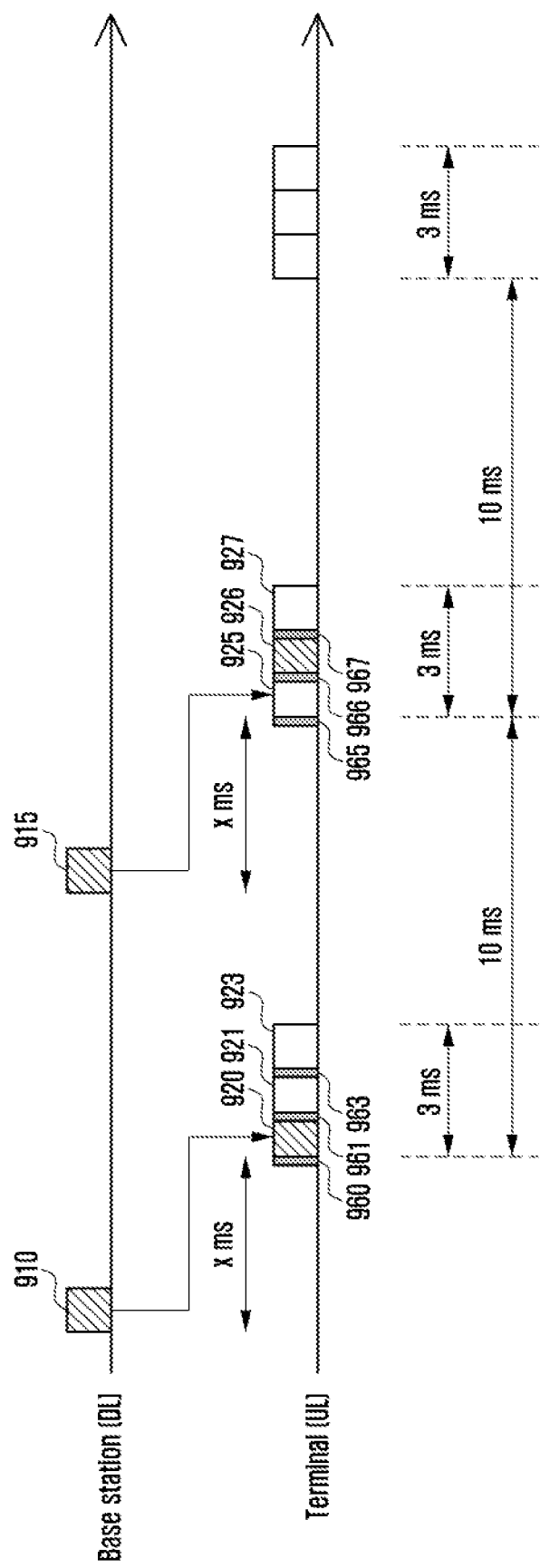
FIG. 9 is a diagram illustrating an example of SPS assignment according to an embodiment of the present disclosure.

FIG. 9 is a diagram illustrating an example of SPS assignment according to an embodiment of the present disclosure.

Referring to FIG. 9, the base station 320 transmits downlink control indicators (DCI) 910 and 915 to the terminal 310 on the PDCCH to instruct the use of the earliest SPS UL bust resources 920, 921, 923, 925, 926, and 927). At this time, the base station 320 may identify a DCI format indicating the use of the earliest SPS UL burst resources 920, 921, 923, 925, 926, and 927 or identifies the DCI by a specific field and transmit it to the terminal 310. According to one embodiment, the time point when the terminal 310 receives the DCIs 910 and 915 and the start time point of the UL bursts 920, 921, 923, 925, 926, and 927 may have an interval of x ms. In this case, if the start time point of the UL burst is not specified in the DCIs 910 and 915, the initial SPS resources 920 and 925 of the earliest UL SPS bursts 920, 921, 923, 925, 926, and 927 may be assigned first. If the starting time of the UL burst is specified in the DCI, 1) for example, if the terminal 310 receives the DCI specified by x in the k subframe, the terminal 310 is set to be assigned the SPS resources 920, 921, 923, 925, 926, and 927 from the k+x subframe to the SPS resources 920, or 2) for example, if the terminal 310 receives the DCI specified by y in the k subframe, the earliest UL burst start time point is k+x subframe and the terminal 310 may be set to be assigned the SPS resources 920, 921, 923, 925, 926, and 927 from the k+x+y subframe.

According to an embodiment, the base station 320 may set the interval between the DCI reception time point 910 and 915 and the first UL SPS resource time points 920 and 925 to be at least 4 ms for the preparation time of the terminal 310 in the case of the SPS activation and then may reduce the interval to 1 or 2 ms before the SPS release. The terminal 310 generates packets to be transmitted in advance after the first SPS bursts 920 and 925 depending on the SPS activation so that the uplink data may be transmitted in the assigned SPS resources 920, 921, 923, and 925, 926, and 927 even if the interval is short as 1 or 2 ms. According to an embodiment, the base station 320 may indicate 4 ms for the initial transmission and may indicate 1 or 2 ms for retransmission in which the HARQ process ID and RV are unchanged.

Meanwhile, the LBTs 960, 961, 936, 965, 966, and 967 have been described with reference to FIG. 8, and therefore a detailed description thereof will be omitted.

FIGS. 10, 11, 12, 13, 14, and 15 are diagrams illustrating examples of SPS consecutive subframe assignment method according to various embodiments of the present disclosure.

Meanwhile, the base station 320 may assign the plurality of subframes to the terminal 310 by one UL grant. The UL grant may be newly designed to reuse the existing UL grant (for two TB assignments) or to represent any k subframes.

Figure 10:
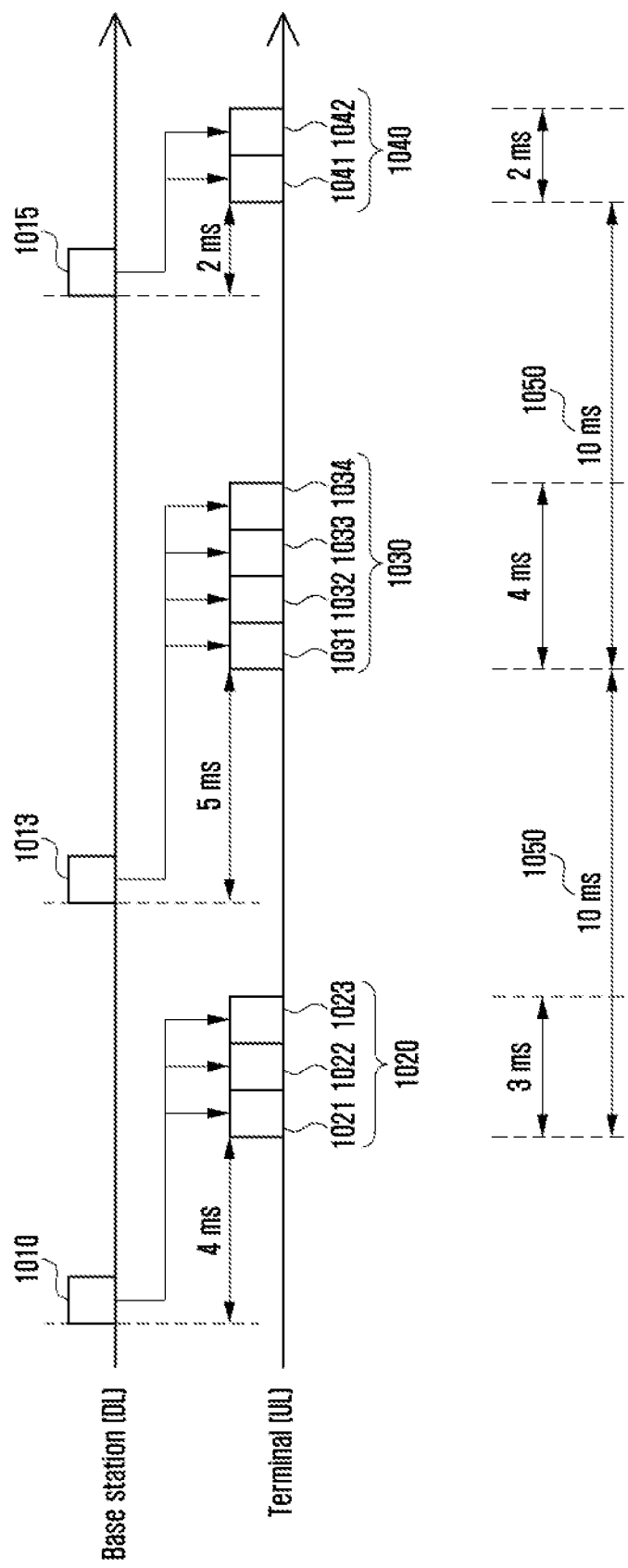
FIGS. 10, 11, 12, 13, 14, and 15 are diagrams illustrating examples of SPS consecutive subframe assignment method according to various embodiments of the present disclosure.

Referring to FIG. 10, the base station 320 may indicate the number of consecutive subframes 1021, 1022, 1023, 1031, 1032, 1033, 1034, 1041, and 1042 constituting UL bursts 1020, 1030, and 1040 by UL grants 1010, 1013, and 1015. In addition, the base station 320 may indicate various common or separate variables of the UL bursts 1020, 1030, and 1040 and the subframes 1021, 1022, 1023, 1031, 1032, 1033, 1034, 1041, and 1042 to the terminal 310 by the UL grants 1010, 1013, and 1015.

The variables used in the UL grants 1010, 1013, and 1015 includes HARQ process related information such as an HARQ process ID, a new data indicator (NDI), and RV and additional information such as a UL transmit power control (UL TPC) command, an SRS transmission command, and LBT information. According to the operation example, some variables are identified into variables common to the UL burst or for each subframe.

According to the example illustrated in FIG. 10, the base station 320 may dynamically indicate the lengths of the UL bursts 1020, 1030, and 1040, that is, the number of consecutive subframes by 3, 4, and 2 for every UL grant 1010, 1013, and 1015. However, the locations of the first subframes 1021, 1031, and 1041 to which the UL bursts 1020, 1030, and 1040 are transmitted may be set periodically 1050 (interval of 10 ms in the example of FIG. 10) at a predetermined fixed location. The base station 320 may notify the terminal 310 of the configuration information of the fixed locations of the first subframes 1021, 1031 and 1041 of the UL bursts 1020, 1030 and 1040 by the RRC message, the PBCH or the MAC CE. Since the locations of the first subframes 1021, 1031 and 1041 of the UL bursts 1020, 1030 and 1040 are fixed, the locations of the first subframes of the UL bursts 1020, 1030 and 1040 from the UL grants 1010, 1013 and 1015 may be different from each other as illustrated in FIG. 10.

Meanwhile, since the locations of the first subframes 1021, 1031 and 1041 of the UL bursts 1020, 1030 and 1040 are fixed, the base station 320 does not explicitly notify the delay time between the separate UL grants 1010, 1013, 1015 and the UL data and the terminal 310 may be operated to start the transmission at the start location of the earliest UL bursts 1020, 1030, and 1040 at the time point when it receives the UL grants 1010, 1013, and 1015. Therefore, if the base station 320 wishes to transmit the fast UL grant, the base station 320 may transmit the UL grants 1010, 1013, and 1015 in the previous subframe shorter than 4 ms at the start location of the UL bursts 1020, 1030, and 1040. For example, the third UL grant 1015 may be transmitted in a subframe 2 ms ahead of the third UL burst 1040. Meanwhile, if the interval between UL bursts is less than 4 ms, the terminal may additionally transmit an indicator for the base 310 station 320 to identify whether the terminal 310 transmits the UL data at the earliest UL burst location or the second UL burst location.

Figure 11:
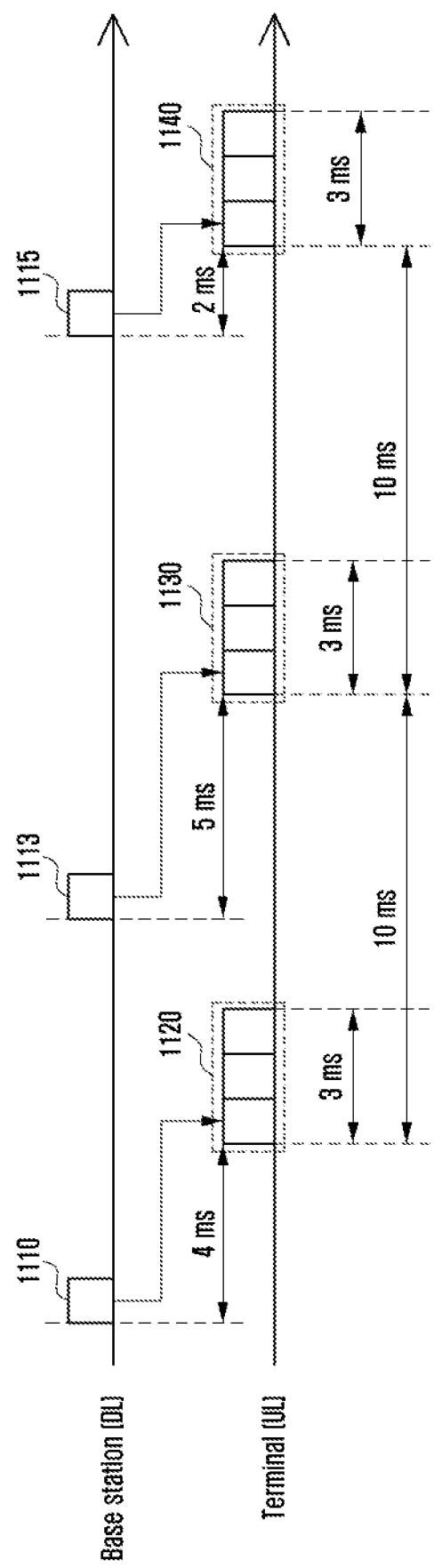

Referring to FIG. 11, similar to the example of FIG. 10, the base station 320 may statically notify the terminal 310 of the lengths of the UL bursts 1120, 1130, and 1140 by the RRC message, the PBCH, or the MAC CE. That is, FIG. 10 illustrates, by way of example, that the base station 320 dynamically indicates the number of subframes constituting UL burst by UL grant. By the way, referring to FIG. 11, the base station 320 statically notifies the terminal 310 of the lengths of the UL bursts 1120, 1130 and 1140 by the RRC message, the PBCH, or the MAC CE and the information on the lengths of the UL bursts 1120, 1130, and 1140 may be included in the UL grants 1110, 1113 and 1115. FIG. 11 illustrates, by way of example, that the lengths of the UL bursts 1120, 1130, and 1140 are 3 ms.

Figure 12:
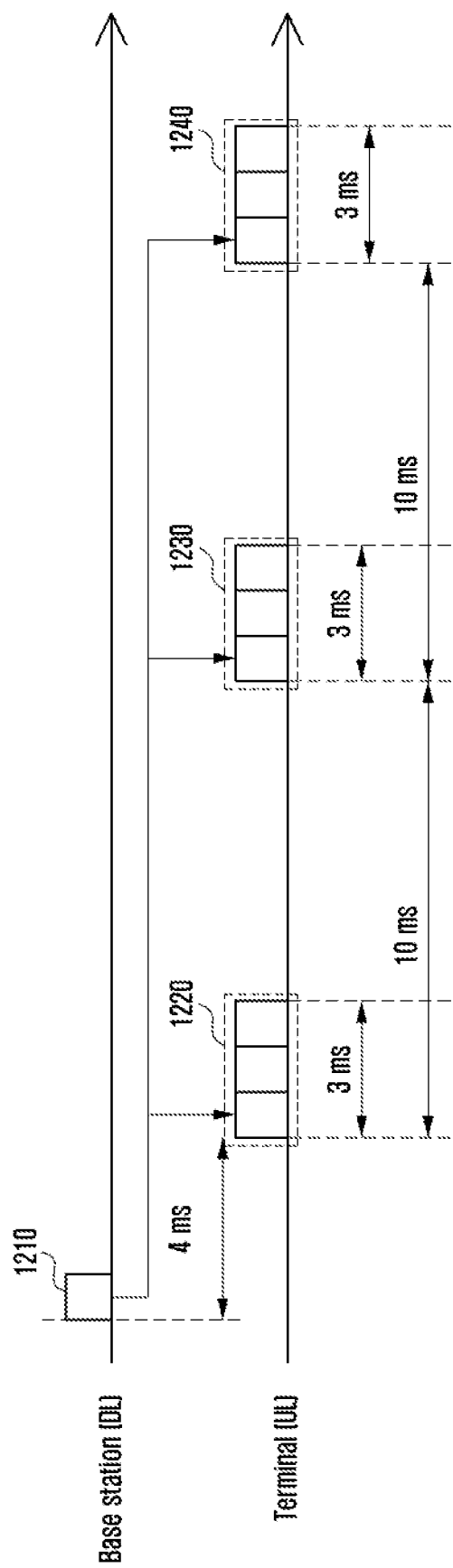

Referring to FIG. 12, the base station 320 may dynamically notify the terminal 310 of the repetition frequency of the UL bursts 1220, 1230, and 1240 by the common or dedicated DCI within the PDCCH by the UL grant 1210. Further, the base station 320 may statically notify the terminal 310 of the length of the UL bursts 1220, 1230 and 1240 by the RRC message, the PBCH, or the MAC CE. According to the embodiment, the base station 320 may statically notify the terminal 310 of the interval between the bursts 1220, 1230 and 1240 by the RRC message, the PBCH, or the MAC CE or may dynamically notify the terminal 310 of the interval by an L 1 signal. In the example of FIG. 12, the base station 320 may notify the terminal 310 that the repletion number of the UL bursts 1220, 1230 and 1240 is three times by the UL grant 1210 message and that the length of the UL bursts 1220, 1230 and 1240 is 3 ms by the RRC message, the PBCH, or the MAC CE.

Figure 13:
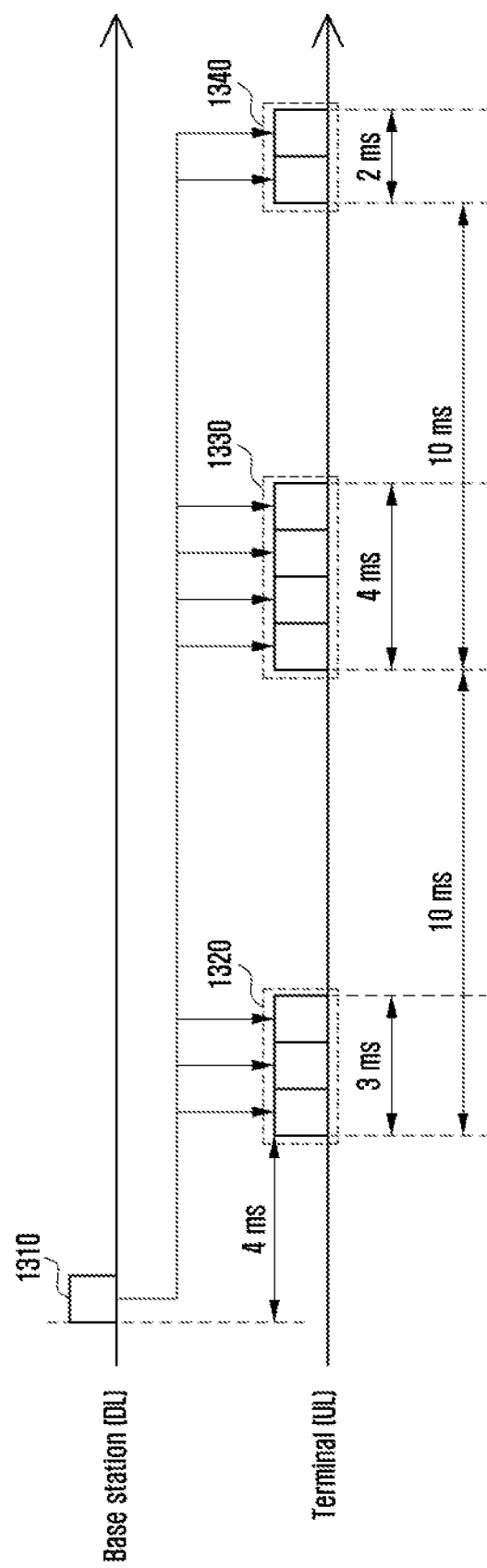

Referring to FIG. 13, the base station 320 may dynamically notify the terminal 310 of the lengths and the repetition frequency of the UL bursts 1320, 1330, and 1340 by the common or dedicated DCI within the PDCCH by the UL grant 1310. The example has the disadvantage of increasing the size of the UL grant. According to the embodiment, the base station 320 may statically notify the terminal 310 of the interval between the bursts 1320, 1330 and 1340 by the RRC message, the PBCH, or the MAC CE or may dynamically notify the terminal 310 of the interval by an L1 signal. In the example of FIG. 13, the base station 320 may notify the terminal 310 that the repetition frequency of the UL bursts 1320, 1330, and 1340 are three times and the lengths of the UL bursts 1320, 1330 and 1340, respectively, are 3 ms, 4 ms, 2 ms by the UL grant 1310 message.

Figure 14:
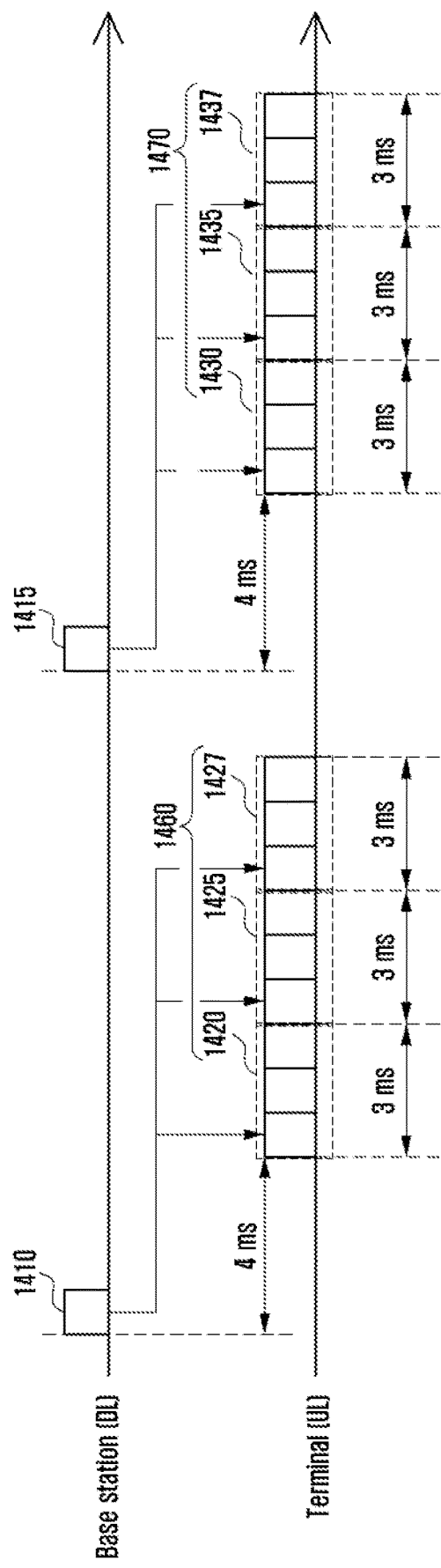

Differently from the example described above with reference to FIGS. 10 to 13, referring to FIG. 14, the base station 320 may dynamically assign bundles 1460 and 1470 (set of UL bursts) of UL bursts 1420, 1425, 1427, 1430, 1435, and 1437 to the terminal 310 by each UL grant 1410 and 1415. The interval between the UL bursts in one of UL grant 1410 and 1415 may be explicitly set to be equal to the lengths of the UL bursts 1420, 1425, 1427, 1430, 1435, and 1437, or may be implicitly determined depending on the type (e.g., data and control signal) of information to be transmitted to the assignment resource. In the case of the data, it is advantageous to continuously assign the UL bursts in the LBT performance and in the case of the control signal, it is advantageous to minimize the control load by the periodic resource assignment. Further, the base station 320 may statically notify the terminal 310 of the length of the UL bursts 1420, 1425, 1427, 1430, 1435, and 1437 by the RRC message, the PBCH, or the MAC CE. In the example of FIG. 14, the base station 320 may dynamically inform the terminal 310 that each of the bundles 1460 and 1470 of UL bursts includes three UL bursts 1420, 1425, 1427, 1430, 1435, and 1437 by the UL grants 1410 and 1415 and can statically notify the terminal 310 of the lengths of the UL bursts 1420, 1425, 1427, 1430, 1435, and 1437 by the RRC message, the PBCH, or the MAC CE.

Figure 15:
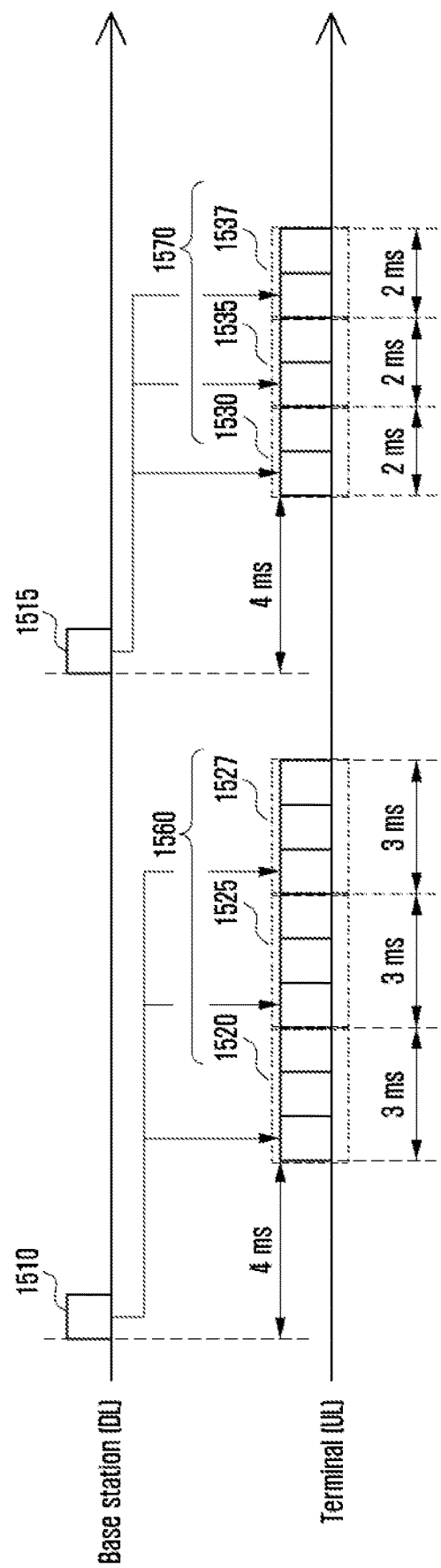

Referring to FIG. 15, like the example of FIG. 15, the base station 320 may dynamically assign s UL bursts 1520, 1525, 1525, 1530, 1535, and 1537 to the terminal 310 by the common DCI or the dedicated DCI along with UL grants 1510 and 1515. In the example of FIG. 15, the base station 320 may dynamically notify the terminal 310 that each of the bundles 1560 and 1570 of the UL bursts include three UL bursts 1520, 1525, 1527, 1530, 1535, and 1537 and the lengths of the UL bursts 1520, 1525, 1527, 1530, 1535, and 1537 by the UL grants 1410 and 1415.

On the other hand, if the LBT fails for one UL resource, the terminal 310 may retry the next UL resource, but if the validity period of the data packet transmitted from the UL resource depending on the setting of the base station 320 expires, the terminal 310 may transmit a new packet without the retry. The base station 320 may set the valid period in the terminal 310 by the RRC message in consideration of the maximum delay depending on the service/traffic requirements of the terminal 310. The validity period may be represented by absolute time and subframe/slot/symbol unit, or may be replaced with a certain number of times. The specific number of times may be, for example, the frequency of SPS bursts that has failed or the SPS resource that has failed.

Skipping UL Grant Related Operation

If the UL data is not present in the buffer, for the SPS resource assigned to the terminal 310 set to skip the UL grant, the base station 320 may not identify whether the terminal 310 skips the SPS resource or the LBT fails in the SRS resource if the base station 320 fails to receive the PUSCH to which the terminal 310 is transmitted. Since the base station 320 may not identify the above two situations and therefore may not perform the operation of explicitly transmitting the SPS release, the terminal 310 needs to compare an ImplicitReleaseAfter counter value, which is an implicit method, with a preset maximum value. However, since the terminal 310 does not actually transmit the zero MAC SDU, it does not increase the ImplicitReleaseAfter counter value for the SPS resource in which the LBT fails. On the other hand, since the base station 320 increases the ImplicitReleaseAfter counter value for the SPS resource reception failure, if the increased ImplicitReleaseAfter counter value reaches the preset maximum value, the base station 320 determines that the terminal 310 is in the SPS release. Accordingly, the base station 320 releases the SPS resource set to the terminal 310 but the terminal 310 still understands that the SPS resource is set, such that the terminal 310 transmits an UL to the UL resource that is not assigned.

In order to address the problem, the terminal 310 transmits a signal for determining an accurate situation to the base station 320 before the base station 320 determines that the terminal 310 is in the SPS release or may transmit a signal for obtaining the SPS activation again after the base station 320 determines that the terminal is in the SPS release. The terminal 310 may transmit 1) information (e.g., SPS Keep Alive MAC CE) requesting to maintain the SPS in the active state to the base station 320 through the PUSCH if there is the UL grant assigned to the PCell or another SCell before the SPS release. At this time, the terminal 310 may transmit the SPS Keep Alive MAC CE together with a carrier indicator field (CIF). Alternatively, 2) the terminal 310 may request the UL grant to the SR or the BSR assigned to the PCell or another SCell and then transmit the information (e.g., SPS Keep Alive MAC CE) requesting to maintain the SPS in the active state to the base station 320 through the PUSCH, for the UL grant assigned before the SPS release. At this time, the terminal 310 may transmit the SPS Keep Alive MAC CE together with the CIF or a small cell group (SCG). Alternatively, 3) the terminal 310 may request the UL grant to the SR or the BSR assigned to the PCell and then transmit an RRC connection request message or an RRC connection re-establishment request message to the base station 320 to the base station 320, for the UL grant assigned after the SPS release.

Further, in order to prevent the ImplicitReleaseAfter counter value from rapidly increasing, the base station 320 may perform counting every SPS resource to prevent the ImplicitReleaseAfter counter value from increasing and perform counting once every SPS resource if all the SPS resources of each UL burst fail to increase the ImplicitReleaseAfter counter value. In order to use the method, both the base station 320 and the terminal 310 may be configured to count the ImplicitReleaseAfter counter value in the same manner, or the base station 320 may set the counting method in the terminal 310.

The SPS-multi subframe setting proposed in the present disclosure is used to reduce the delay until the message 3 is transmitted to the UL grant of the random access response (RAR) at the time of handover (HO) and the base station 320 may include the SPS assignment in the HO command or PRACH configuration.

Figure 16:
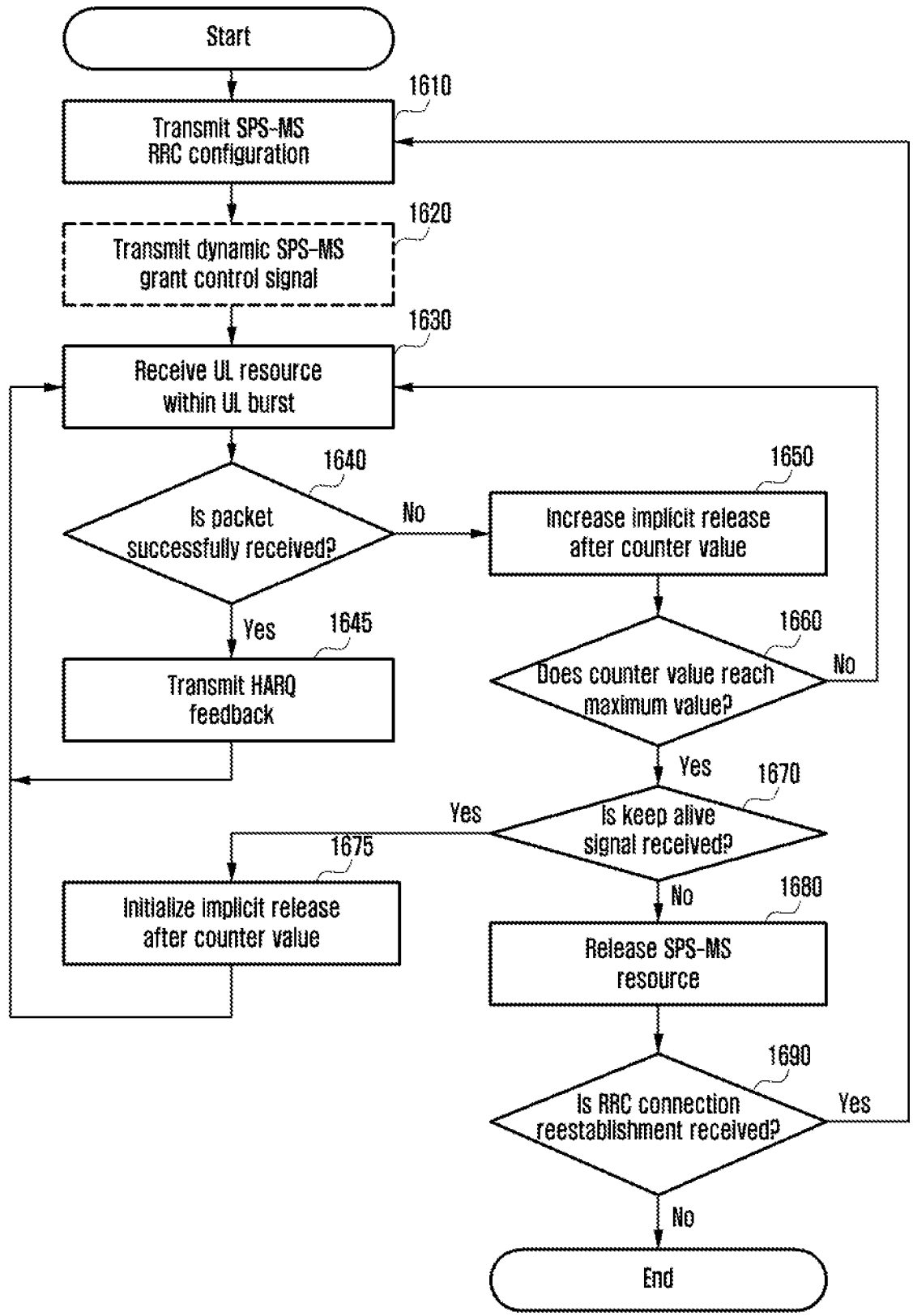
FIG. 16 is a diagram illustrating an example of a multi subframe setting operation of a base station according to an embodiment of the present disclosure.

FIG. 16 is a diagram illustrating an example of a multi-subframe setting operation of a base station according to an embodiment of the present disclosure.

Referring to FIG. 16, in operation 1610, the base station 320 may transmit an RRC configuration message including the configuration information for an SPS MS to the terminal 310.

Further, in operation 1620, the base station 320 may transmit a dynamic SPS MS grant signal to the terminal 310. This has been described with reference to FIGS. 6 to 15, and a detailed description thereof will be omitted.

The base station 320 may receive the UL resource in the UL burst in operation 1630 and may determine whether the (uplink) packet reception transmitted from the terminal 310 through the UL resource succeeds in operation 1640.

If the packet reception succeeds, the base station 320 may transmit HARQ feedback (ACK) to the terminal 310 in operation 1645. Further, in operation 1630, the base station 320 may try to receive uplink data of the terminal 310 from another UL resource in the UL burst.

On the other hand, if the packet reception fails, the base station 320 may increase the ImplicitReleaseAfter counter value in operation 1650. Further, in operation 1660, the base station 320 may determine whether the ImplicitReleaseAfter counter value has reached the preset maximum value. If the ImplicitReleaseAfter counter value does not reach the preset maximum value, in operation 1630, the base station 320 may try to receive uplink data of the terminal 310 from another UL resource in the UL burst.

On the other hand, if the ImplicitReleaseAfter counter value reaches the predetermined maximum value, in operation 1670, the base station 320 may determine whether the keep alive signal (SPS Keep Alive MAC CE) transmitted from the terminal 310 is received. That is, the base station 320 may determine whether the information requesting to maintain the SPS in the active state is received from the terminal 310.

If the base station 320 receives the keep alive signal, the base station 320 initializes the ImplicitReleaseAfter counter value in operation 1675, and may proceed to operation 1630.

If the ImplicitReleaseAfter counter value reaches the preset maximum value, the base station 320 determines that the terminal 310 is in the SPS release. However, as in the above case, the terminal 310 does not increase the ImplicitReleaseAfter counter value for the SPS resource in which the LBT fails. In this case, the base station 320 releases the SPS resource set in the terminal 310, and the terminal 310 determines that the SPS resource is still set and thus may transmit the keep alive signal to the base station 320 to prevent the UL transmission to the UL resource that is not assigned. If the terminal 310 transmits the keep alive signal to the base station 320, the base station 320 is maintained in the SPS active state and may try to receive the UL data from the terminal 310 even if the ImplicitReleaseAfter counter value reaches the predetermined maximum value.

Further, if the base station 320 does not receive the keep alive signal in operation 1670, the base station 320 may terminate the SPS MS resource in operation 1680.

The keep alive signal may be replaced with another type of UL signal of the terminal 310, for example, SR, BSR, SRS, MAC CE, or the like. At this time, in order to be identified from the existing UL signal, at least one of a new bit, a field, and a sequence is added to transmit the assigned information for the keep alive signal or reuse the existing UL signal but may consider the UL signal as the keep alive signal as long as the base station 320 and the terminal 310 satisfy a specific condition. For example, if the terminal 310 transmits the UL signal before the ImplicitReleaseAfter counter value reaches the maximum value (i.e., preset maximum value) after the timer set after the last transmission in the SPS UL burst expires, the base station 320 receiving the UL signal may regard the UL signal as the keep alive signal. As another example, after the ImplicitReleaseAfter counter value reaches a first threshold value, if the terminal 310 transmits the UL signal before the ImplicitReleaseAfter counter value reaches a second threshold value, the base station 320 receiving the UL signal may regard the UL signal as the keep alive signal.

Further, in operation 1690, the base station 320 may determine whether the RRC connection reestablishment message is received. If the base station 320 receives the RRC connection reestablishment message, the base station 320 returns to operation 1610, and if not, the base station 320 may terminate the procedure.

Figure 17:
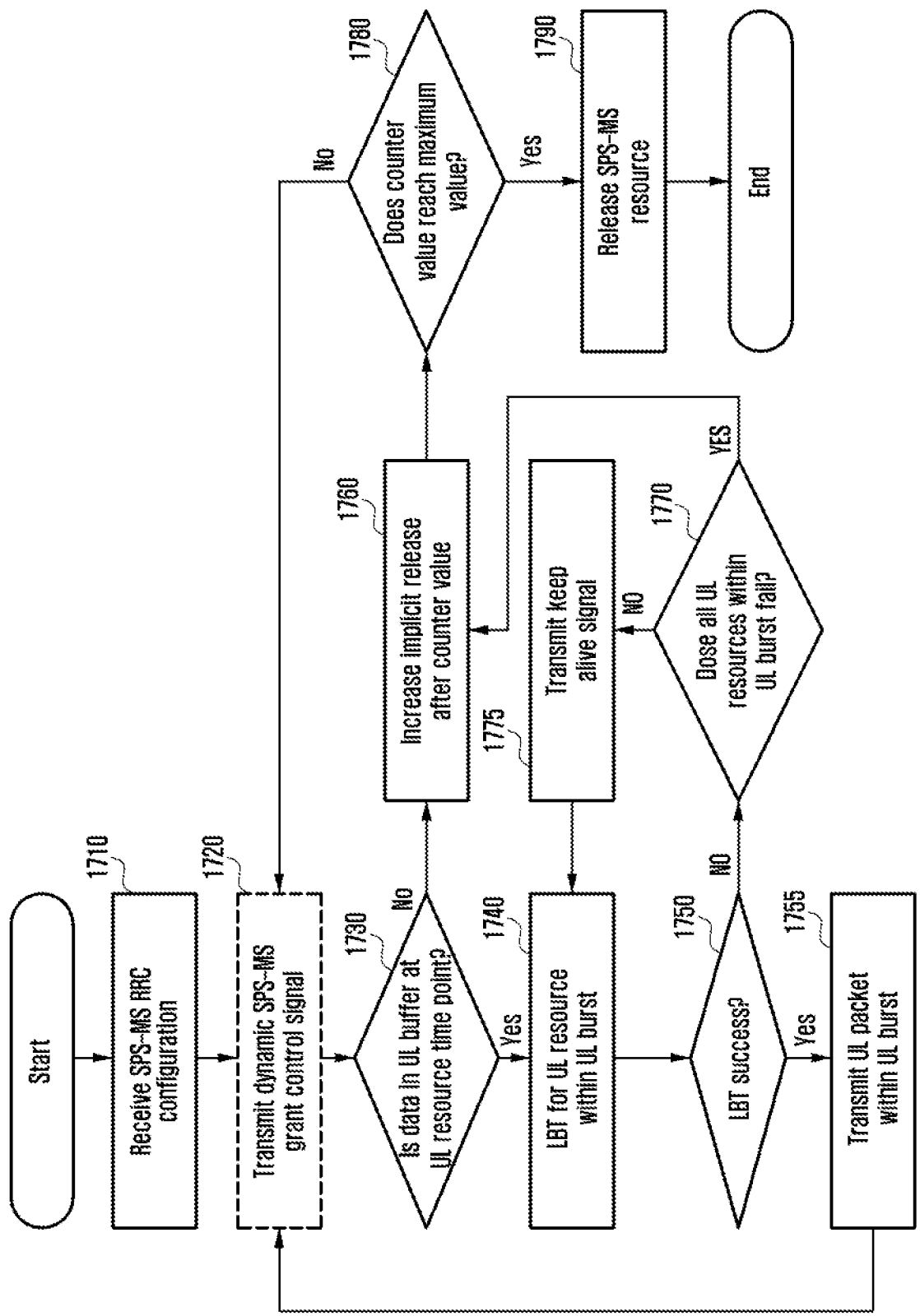
FIG. 17 is a diagram illustrating an example of a multi subframe setting operation of a terminal according to an embodiment of the present disclosure.

FIG. 17 is a diagram illustrating an example of a multi-subframe setting operation of a terminal according to an embodiment of the present disclosure.

Referring to FIG. 17, in operation 1710, the terminal 310 may receive the RRC configuration message including the configuration information for the SPS MS from the base station 320.

Further, in operation 1720, the terminal 310 may receive the dynamic SPS MS grant signal from the base station 320. This has been described with reference to FIGS. 6 to 15, and a detailed description thereof will be omitted.

Hereinafter, in operation 1730, the terminal 310 may determine whether there is data to be transmitted in the UL buffer of the terminal 310 at the UL resource time point assigned to the terminal 310 in operation 1730.

If there is no data to be transmitted in the UL buffer of the terminal 310, the terminal 310 may increase the ImplicitReleaseAfter counter value in operation 1760.

On the other hand, if there is no data to be transmitted in the UL buffer of the terminal 310, the terminal 310 may perform the LBT on the UL resource in the UL burst in operation 1740. Further, in operation 1750, the terminal 310 may determine whether the LBT succeeds.

If the LBT succeeds, the terminal 310 may transmit the UL data (UL packet) from the UL resource corresponding to the succeeding LBT in the UL burst to the base station 320 in operation 1755.

On the other hand, if the LBT fails, in operation 1770, the terminal 310 may determine in operation 1770 whether the LBT fails for all the UL resources in the UL burst.

If the LBT does not fail for all the UL resources in the UL burst, the terminal 310 returns to operation 1740 and may perform the LBT on the next UL resource in the UL burst. At this time, the terminal 310 may transmit the keep alive signal (SPS Keep Alive MAC) for requesting the base station 320 to maintain the SPS active state to the base station 320 in operation 1775. Further, in operation 1740, the terminal 310 may perform the LBT on the next UL resource in the UL burst if the LBT fails for all UL resources in the UL burst.

If the LBT fails for all the UL resources in the UL burst, the terminal 310 may increase the ImplicitReleaseAfter counter value in operation 1760.

After increasing the ImplicitReleaseAfter counter value in operation 1760, the terminal 310 may determine whether the ImplicitReleaseAfter counter value reaches the preset maximum value in operation 1780. If the ImplicitReleaseAfter counter value reaches the preset maximum value, the terminal 310 may release the SPS MS resource in operation 1790. On the other hand, if the ImplicitReleaseAfter counter value does not reach the preset maximum value, the terminal 310 may wait to receive the dynamic SPS MS grant signal from the base station 320 in operation 1720.

Meanwhile, in the example of the consecutive subframe (multi subframe) and UL burst assignment, the location where the terminal 310 performs the LBT may be set by a method of combining (union of CCA gap locations) at least one of the followings.

a) Perform the LBT in the CCA gap configured for transmission in the first UL subframe assigned to the UL grant.

b) Perform the LBT in the CCA gap configured for the transmission in the UL burst start subframe.

c) Perform the LBT in the CCA gap configured for the transmission every UL subframe assigned to the UL grant.

d) Perform the LBT in the CCA gap configured for the transmission in the corresponding subframe if the terminal 310 sets the CCA gap location (e.g., offset, period, or the like) is set by the separate common DCI and thus the UL burst is located at the location.

e) Perform the LBT in the CCA gap configured for the transmission in the corresponding subframe if the terminal 310 sets the CCA gap location (e.g., offset, period, or the like) by the higher layer control signal like to the RRC message and thus the UL burst is located at the location.

Meanwhile, if the base station 320 dynamically notifies the terminal 310 of the CCA gap location by the PDCCH, the base station 320 is based on the subframe for transmitting the UL grant or if the base station 320 statically notifies the terminal 310 of the CCA gap location by the RAC message, the base station 320 may be based on the reference time of the Pcell or the reference time of the DL burst.

Meanwhile, for the CCA gap setting, a method for setting LBT types (e.g., FBE-CAT2 LBT, LBE-CAT4 LBT, or the like) may be operated according to at least of the following methods.

a) The terminal 310 uses LBE-CAT4 LBT for transmission in the UL burst start subframe.

b) The terminal 310 uses FBE-CAT2 LBT for transmission in the UL burst start subframe.

c) The terminal 310 uses FBE-CAT2 LBT for transmission in the subframe in the bundle of UL bursts.

d) The terminal 310 uses the FBE-CAT2 LBT in the CCA gap indicated by the common DCI.

e) The terminal 310 uses the FBE-CAT2 LBT except the final gap of the CCA gaps indicated by the common DCI and uses the LBE-CAT4 LBT in the final gap.

f) The terminal 310 uses the LBE-CAT4 LBT in the CCA gap indicated by the RRC.

g) The terminal 310 uses the LBE-CAT4 LBT if the resource is not assigned by the UL grant in the CCA gap indicated by the RRC.

h) The terminal 310 uses the FBE-CAT2 LBT if the resource is not assigned by the UL grant in the CCA gap indicated by the RRC.

i) The terminal 310 uses the FBE-CAT2 LBT if the resource is not assigned by the UL grant in the CCA gap indicated by the RRC and is in the UL burst.

j) When the terminal 310 receives the MCOT (DL+UL) length information by the PDCCH common DCI, if the UL signal within the MCOT is transmitted, the terminal 310 uses the FBE-CAT2 LBT and if the UL signal outside the MCOT is transmitted, the terminal 310 uses the LBE-CAT4 LBT.

k) When the terminal 310 receives the offset information up to the final subframe of the MCOT by the PDCCH common DCI, if the UL signal within the MCOT is transmitted, the terminal 310 uses the FBE-CAT2 LBT and if the UL signal outside the MCOT is transmitted, the terminal 310 uses the LBE-CAT4 LBT.

In the multi-subframe scheduling, if the UL grant is duplicated in one terminal 310, at least one of the following overwriting rules may be applied.

A new UL grant may remove the existing UL grant except in the following cases: (New UL grant remove all existing UL grant except);
1) Very next UL grant following DL burst
2) Existing UL grant within MCOT of eNB w. r. t previous UL grant
3) Existing UL grant within MCOT of eNB w. r. t new UL grant 4) Existing UL grant within N subframes of eNB (DL) indicated by eNB 5) Existing UL grant within N subframes of terminal (UL) indicated by eNB According to one embodiment, the base station 320 may update the common DCI notifying the terminal 310 of the end of the MCOT and notify the terminal 310 of the updated common DCI. The base station may not receive 1) the transmission of all terminals 310 in the scheduled UL subframe, or 2) may further extend the end of the MCOT and notify it to the terminal if all terminals receive the LBT failure by the LBT result report. The terminal within the extended MCOT, the terminal may retransmit the UL data transmissions that have failed in the LBT according to a predetermined rule.

Multi Subframe Scheduling Method for Notifying LBT Result

It is difficult for the base station 320 to determine the UL LBT result of the terminal 310 without any report. The base station 320 should determine the reliability of the received PUSCH signal as the detection result of the DMRS multiplexed with the PUSCH and transmitted by the terminal 310. However, it is difficult for the base station 320 to determine whether the DMRS is not received due to high interference or whether the terminal 310 does not transmit the DMRS due to the LBT failure. Therefore, if the terminal 310 reports to the base station 320 whether the LBT succeeds or fails, the base station 320 may take the operation utilizing the LBT success/failure. As described above, the base station 320 may indicate the fast UL grant to the terminal 310 in which the LBT fails. To support the operation, the format and procedure for reporting the LBT results need to be defined as follows. The signal of the LBT result report may be referred to by various names such as an LBT result report, an LBT result indication, and a DTX indication.

a) LBT Result Report Format

For one SCell (or component carrier (CC)): The terminal 310 uses at least one of the format 0, format 1a, and format 1b (FDD 1CC) including the SR among the existing UCI formats not to transmit 1 bit information notifying the LBT result instead of the SR to the base station SR through the unlicensed SCell. Alternatively, according to the existing method, a method for transmitting UCI information (CQI, RI, HARQ-ACK/NACK, NDI) to a PUSCH by multiplexing the UCI with a UL shared channel (UL-SCH) is reused, and thus the LBT result indication may be transmitted using the HARQ-ACK/NACK, other cyclic time shift values, and a spread code in a 1-bit resource that transmits the HARQ-ACK/NACK. Since the unlicensed band operates with the CA, it is sufficient to transmit the actual SR to the PCell (or licensed band S Cell). i) The base station 320 may consider the SR received in the SCell of a particular unlicensed band as the LBT result in that SCell. Alternatively, ii) the base station 320 may regard it as the LBT result for the UL data transmission assigned at the most recent time point. Alternatively, iii) when the base station 320 may not identify the band format, if the SR is received in a manner specified in the following LBT result report procedure, the base station 320 may be operated by considering it as the LBT result. Alternatively, the method of notifying, by a terminal 310, HARQ DTX to a base station 320 may be applied to the LBT result indication method as it is.

For plurality of SCells or CCs: The terminal 310 uses the format 3 including the SR among the existing UCI formats to transmit 11 bits (FDD)/21 bits (TDD) information for five ccs notifying the LBT result instead of the SR to the base station 320 through the unlicensed SCell. Alternatively, according to the existing method, a method for transmitting UCI information (CQI, RI, HARQ-ACK/NACK, NDI, or the like) by multiplexing the UCI with the UL-SCH is reused, and thus the LBT result indication for two ccs may be transmitted using the HARQ-ACK/NACK, other cyclic time shift values, and a spread code in a 2-bit resource that transmits the HARQ-ACK/NACK. If the number of UCI cell groups set in the terminal 310 is equal to or smaller than 5 or 2 at which the number of CCs that may report the LBT result may be represented at one time, they are mapped in order from the lowest SCell index to identify the LBT result for the specific SCell. If the UCI cell group number is equal to or greater than the 5 or 2, it may be additionally identified according to the time point at which the UCI information is transmitted. For example, the UCI cell group number may be identified as when the UCI information is transmitted in odd subframes, it indicates a 1-5 SCell index, and if the UCI information is transmitted in even subframes, it indicates a 6-10 SCell index.

Meanwhile, if the report information of the LBT result is insufficient for only 1 bit, the subframe index, the report may be made in at least one of the four schemes of the bitmap in the UL burst, the HARQ process ID tried to perform the transmission in the subframe in which the LBT fails to transmit in the failed subframe, and the interval between the subframe in which the LBT fails.

b) LBT Result Report Procedure

If the terminal 310 intends to transmit the LBT result report to the base station 320, the method for reporting the LBT result to the PCell or the licensed band SCell may be considered first, but there may be a burden to assign a lot of UCI resources to a rare licensed band. Therefore, according to the present disclosure, the LBT result may be reported in the unlicensed band SCell.

The basic LBT result report procedure is relatively simple under the assumption of the UL grants for one UL subframe. That is, the terminal 310 may transmit the LBT result for the previous UL data to the base station 320 by multiplexing the LBT result with the UL-SCH if the UL data is transmitted in the next assigned resource. However, the method is not easy to identify the case in which the LBT fails consecutively and notify it. If necessary, the method for reusing an SR field for five ccs of UCI format 3 and reporting LBT results for the previous 5 subframes may be addressed. However, the procedure has a disadvantage in that a long delay time is required until a new UL grant and LBT therefor succeed to allow the base station 320 to confirm the LBT results.

If the base station 320 assigns the UL resource to the terminal 310 by the UL grants for the plurality of UL subframes, it is possible to reduce the delay of the LBT result report compared to the case where a UL grant for a single UL subframe is used. This is because the base station 320 assigns the UL subframe having an appropriate number at a time based on the interference of the unlicensed band or the LBT success rate. For example, if four subframes are assigned by one UL grant, the terminal 310 may fail to perform the LBT in a first or second subframe and may successfully perform the LBT in third/fourth subframes. The terminal 310 transmits i) the LBT result report to the base station 320 in the succeeding first subframe (third subframe in the example) to the base station 320 or ii) the LBT result report to the base station 320 in all the succeeding subframes (third and fourth subframes in the above example), among the k assigned subframes.

station 320 may transmit a normal UL grant or the fast UL grant proposed in the present disclosure to the terminal 310 to instruct the retransmission. This may be the following Table 2.

TABLE 2

| Case | LBT success report subframe | LBT failure report subframe | Location of subframe of data to be retransmitted due to LBT failure |
|---|---|---|---|
| Success (n + 4), Success (n + 5), Success (n + 6) | n + [4, 5, 6] | Absence | Absence |
| Failure (n + 4), Success (n + 5), Success (n + 6) | n + 6 | n + 5 | n + 4 |
| Failure (n + 4), Failure (n + 5), Success (n + 6) | Absence | n + 6 | n + [4, 5] |
| Failure (n + 4), Failure (n + 5), Failure (n + 6) | Absence | Absence | n + [4, 5, 6] |
| Success (n + 4), Failure (n + 5), Failure (n + 6) | n + 4 | Absence | n + [5, 6] |
| Success (n + 4), Success (n + 5), Failure (n + 6) | n + [4, 5] | Absence | n + 6 |
| Success (n + 4), Failure (n + 5), Success (n + 6) | n + 4 | n + 6 | n + 5 |

Various examples that may be generated when assigning three subframes in n subframes and when operated according to i) are described below. If the base station 320 receives the LBT result report from the terminal 310, the base station 320 may instruct the terminal 310 to retransmit the subframe from [the reception failure subframe just next to the reception success subframe] to the [subframe-1 in which the LBT result report is received]. At this time, the base station 320 may transmit a normal UL grant or the fast UL grant proposed in the present disclosure to the terminal 310 to instruct the retransmission. This may be the following Table 1.

TABLE 1

| Case | LBT result report subframe | Location of subframe of data to be retransmitted due to LBT failure |
|---|---|---|
| Success (n + 4), Success (n + 5), Success (n + 6) | n + 4 | Absence |
| Failure (n + 4), Success (n + 5), Success (n + 6) | n + 5 | n + 4 |
| Failure (n + 4), Failure (n + 5), Success (n + 6) | n + 6 | n + [4, 5] |
| Failure (n + 4), Failure (n + 5), Failure (n + 6) | Absence | n + [4, 5, 6] |
| Success (n + 4), Failure (n + 5), Failure (n + 6) | Absence | n + [5, 6] |
| Success (n + 4), Success (n + 5), Failure (n + 6) | Absence | n + 6 |
| Success (n + 4), Failure (n + 5), Success (n + 6) | n + 6 | n + 5 |

Various examples that may be generated when assigning three subframes in n subframes and when operated according to ii) are described below. If the base station 320 receives the LBT result report from the terminal 310, the base station 320 may instruct the terminal 310 to retransmit the subframe from [reception failure subframe just next to the subframe receiving the LBT success report] to the [subframe in which the LBT failure report is received—1]. At this time, the base FIG. 18 is a diagram illustrating an example of UL multi subframe assignment and a transmission thereof according to an embodiment of the present disclosure, FIG. 19 is a diagram illustrating an example of a UL multi subframe assignment and a transmission and a retransmission thereof according to an embodiment of the present disclosure, and FIG. 20 is a diagram illustrating an example of a UL multi subframe assignment and a transmission and a retransmission thereof according to an embodiment of the present disclosure.

By using the LBT result report described with reference to FIGS. 18 to 20, any advantages in the retransmission delay will be described.

Figure 18:
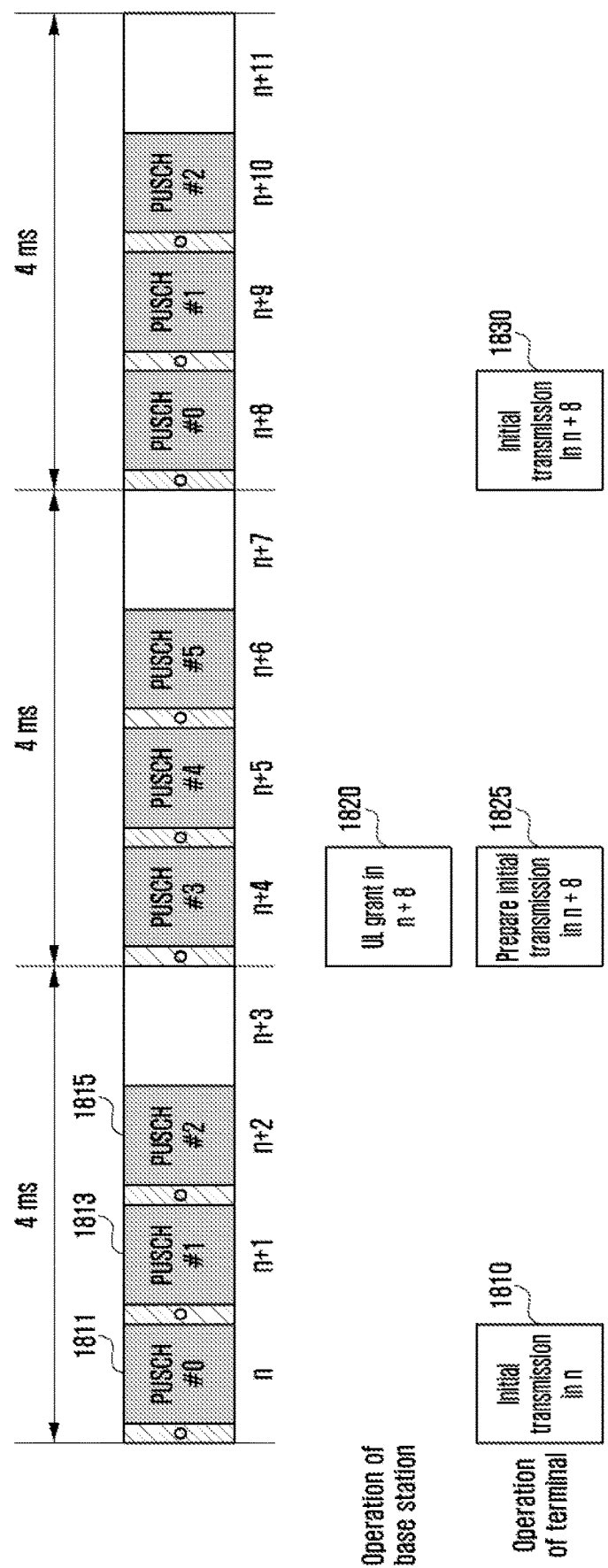
FIG. 18 is a diagram illustrating an example of uplink (UL) multi subframe assignment and a transmission thereof according to an embodiment of the present disclosure.

Referring first to FIG. 18, the terminal 310 may receive the UL grant of the base station 320 and may successfully transmit HARQ process #0 1811 under the situation in which three consecutive multi-sub-frames (HARQ processes #0, #1, #2) 1811, 1813 and 1815 are assigned at an interval of 4 ms at reference numeral 1810. Further, the terminal 310 receives the UL grant for the multi-subframe starting from subframe n+8 from the base station 320 in the next multi-subframe n+4 at reference numeral 1820 and may prepare the initial transmission packet to be transmitted in the subframe n+8 at reference numeral 1825. Thus, the terminal 310 may perform initial transmission in the multi-subframe starting from the subframe n+8 at reference numeral 1830.

Figure 19:
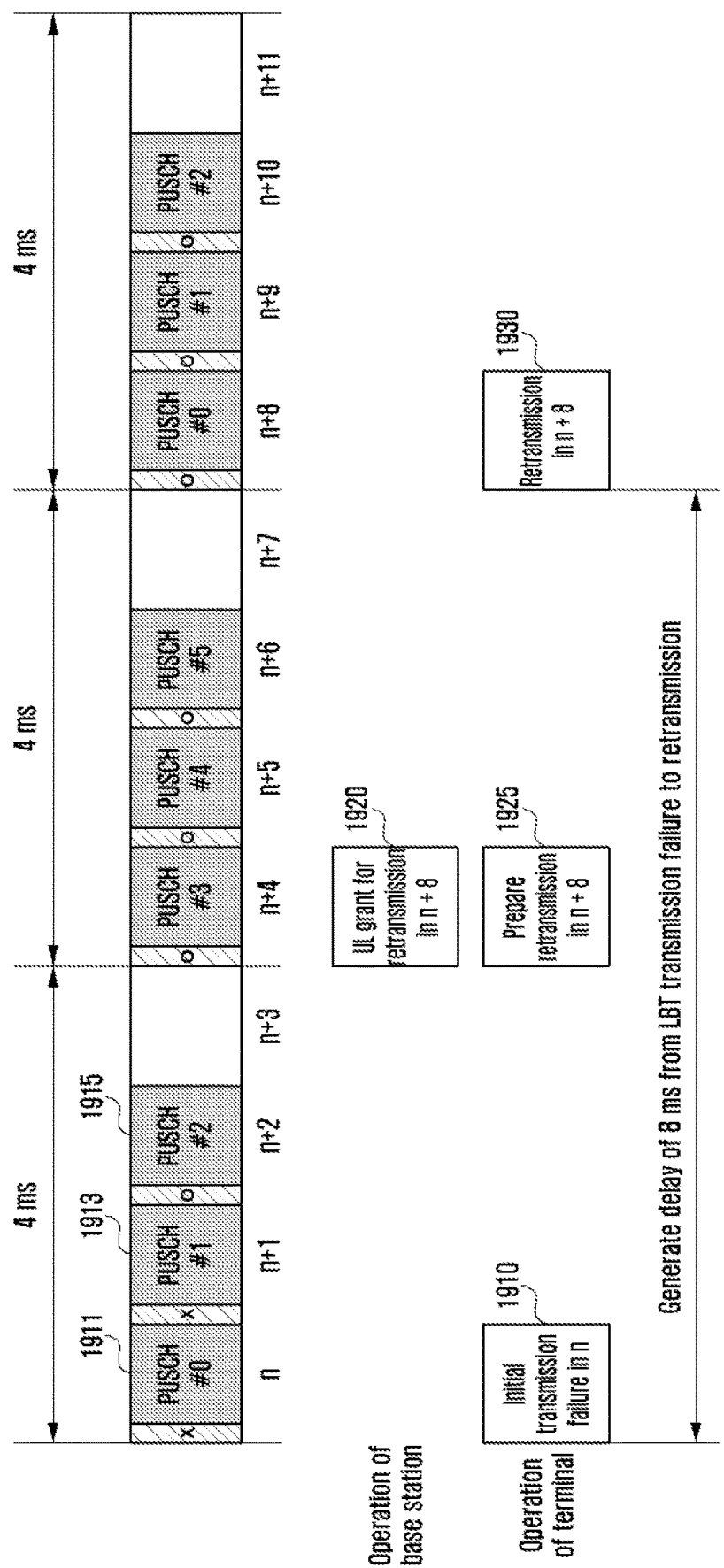
FIG. 19 is a diagram illustrating an example of a UL multi subframe assignment and a transmission and a retransmission thereof according to an embodiment of the present disclosure.
Figure 20:
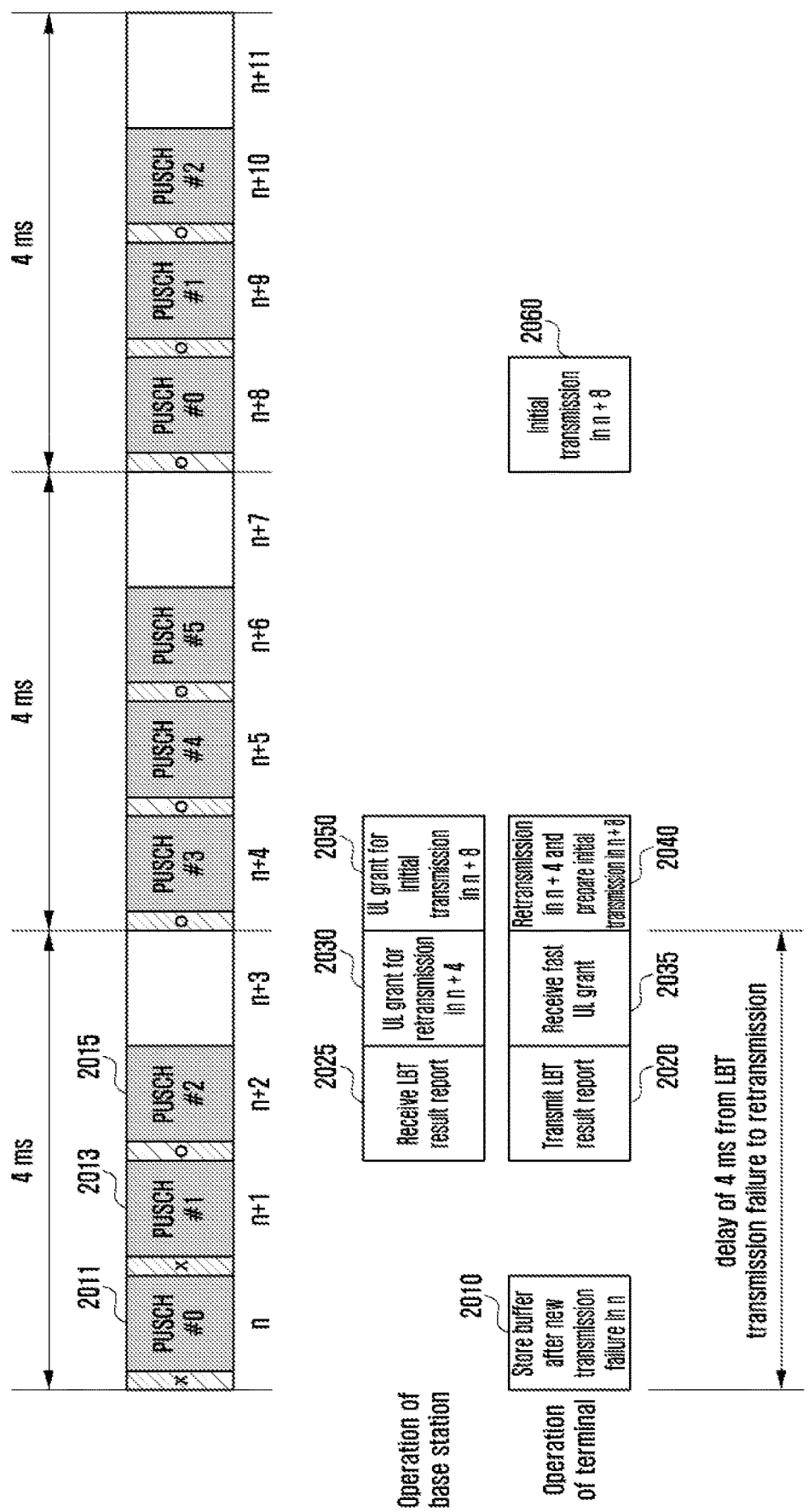
FIG. 20 is a diagram illustrating an example of a UL multi subframe assignment and a transmission and a retransmission thereof according to an embodiment of the present disclosure.

Referring to FIG. 19, among HARQ processes #0, #1, and #2 transmission resources 1911, 1913, and 1915 that are assigned from the base station 320 to the terminal 310 by the first multi-frame UL grant, the LBT before the data transmission for subframe n 1911 and subframe n+1 1913, that is, HARQ process #0 1911 and HARQ process #1 1913 may fail. Accordingly, the terminal 310 may fail to perform the initial transmission in the subframe n at reference numeral 1910. By the way, the base station 320 may not know whether the failure cause of the reception of the UL PUSCH in the subframe n 1911 and the subframe n+1 1913 is the high interference or the failure of the LBT by the terminal 310. Accordingly, the base station 320 may complementarily instruct the terminal 310 to perform the assignment for the retransmission in subframe n+4 (e.g., to PCell) at reference numeral 1920. The terminal 310 may prepare the UL data to be retransmitted in the subframe n+8 according to the instruction at reference numeral 1925 and transmit the retransmission packet in the subframe n+8 at reference numeral 1930. Therefore, a delay of 8 ms may be required up to retransmit the UL data in which the LBT fails in subframe n in subframe n+8.

Referring to FIG. 20, among HARQ processes #0, #1, and #2, subframes 2011, 2013, and 2015 that are assigned from the base station 320 to the terminal 310 by the first multi-frame UL grant, the LBT before the data transmission for subframe n 2011 and subframe n+1 2013, that is, HARQ process #0 and HARQ process #1 may fail. Accordingly, the terminal 310 may fail to perform the initial transmission in the subframe n and store the packet whose transmission fails in the buffer (2010). At this time, the base station 320 may not know in subframe n 2011 and subframe n+1 2013 whether the failure cause of the reception of the UL PUSCH in the subframe n 2011 and the subframe n+1 2013 is the high interference or the failure of the LBT by the terminal 310. However, if the terminal 310 succeeds to perform the LBT in the subframe n+2 2015 and transmits the LBT result report to the base station 320 at reference numeral 2020 and the base station 320 receives the LBT result report at reference numeral 2025, the base station 320 may transmit the fast UL grant command for the UL data that is not be transmitted due to the LBT failure in the subframe n+3 to the terminal 310 at reference numeral 2030. If the terminal 310 receives the fast grant command in the subframe n+3 at reference numeral 2035, the stored UL data to be transmitted depending on the LBT failure may be transmitted in the immediately next subframe n+4 at reference numeral 2040. Therefore, it is possible to improve the delay time by 4 ms from the existing 8 ms for the retransmission of the packet in which the LBT fails. Further, the base station 320 transmits the UL grant for the initial transmission of the multi-subframe starting from the subframe n+8 to the terminal 310 in the subframe n+4 at reference numeral 2050. Accordingly, the terminal 310 may perform the initial transmission in a multi-subframe starting from subframe n+8 at reference numeral 2060.

The base station 320 may instruct the fast UL grant to the terminal 310 by the CC scheduling in the PCell or the licensed band SCell or by the self-carrier scheduling in the unlicensed band SCell.

Details of PRACH Configuration Method

The base station 320 may instruct the terminal 310 to perform a random access (RA) access procedure in the unlicensed band SCell. According to the general RA procedure, the base station 320 and the terminal 310 may perform and complete a contention-based RA procedure through the following procedure.

Previous procedure: The terminal 310 confirms variables (e.g., RAR window, CR timer, backoff index, maximum retry count, variables for power control, etc.) that are related to the location of the RACH resource for RA and the terminal operation required for the RACH procedure through the process of synchronization and SI acquisition.

Operation 1: The terminal 310 may transmit a random access preamble (RAP) sequence (msg1) to the base station 320. It is possible to select the preamble ID of one of the selected preamble ID sets.

Operation 2: The base station 320 may transmit a RAR message (msg2) to the terminal 310. The terminal 310 may receive the msg2 identified based on the RA-RNTI determined in operation 1.

Operation 3: The terminal 310 may transmit a specific message (msg3) to the base station 320 by the resource assigned in the msg2. The base station 320 may identify the msg3 of the terminal by the temporary C-RNTI transmitted to the terminal 310 in operation 2.

Operation 4: The base station 320 may transmit a specific message (message 4) to the terminal 310. The terminal 310 may receive the msg4 identified based on the temporary C-RNTI received in operation 2.

The terminal 310 may receive the SI block 2 (SIB2) to determine the initial transmit power of the terminal, and may perform the RAP transmission of operation 1 with a predetermined initial transmit power. If the terminal 310 does not receive the RAP message from the base station 320 within a specific period (RAR window) after the terminal 310 transmits the RAP, the terminal 310 determines that the RA fails and the terminal 310 retransmits the RAP message. Generally, the terminal 310 may retransmit the RAP message to the base station 320 as many as the set maximum retry number. If the terminal 310 does not receive the RAR message even after retransmission of the RAP message by the maximum retry number, the terminal 310 increases the transmit power by the power ramping up value set to the transmit power and may start the RA procedure again by resetting the retry number to 0. In the above description, the variables such as the initial transmit power, the RAR window, and the maximum retry number are included in the SIB message of the base station.

In the case of the contention-free RA procedure, the base station 320 starts the RA of the specific terminal 310 by a physical DL control channel (PDCCH) order or the RRC message of the higher layer. At this time, the signal for each instruction includes a mask index as to which resource of the preamble ID to be used by the terminal 310 and the RACH resource is to be allowed to use.

The terminal 310 may perform the RAP transmission based on the location of the PRACH resource acquired through the RRC message for SIB2 or mobility/SCell addition with respect to the existing licensed band, the timing notified by the PDCCH order, and the mask index notifying where the PRACH resource is transmitted. Meanwhile, the terminal 310 needs to assign a redundant resource that may perform the RAP try several times to overcome the LBT failure in the unlicensed band. The location of the PRACH resource may notify a PRACH configuration (setting) index set in frame units by including the PRACH configuration index in the PDCCH order or RRC message. The PRACH configuration and its reference time may be defined as shown in the following example by a semi-static or dynamic method. The terminal 310 may determine to which subframe and/or which frequency resource block the RACH resource is assigned depending on the PRACH configuration index.

a-1) The terminal 310 may apply the FDD/TDD configuration for the licensed band in the same manner even in the unlicensed band SCell on the basis of the PCell subframe index, or a-2) the terminal 310 may additionally receive the FDD/TDD configuration having the different licensed band but the same format and apply the FDD/TDD configuration in the same manner even in the unlicensed band SCell on the basis of the PCell subframe index, or a-3) the terminal 310 may additionally receive the PRACH configuration for the unlicensed band only and apply the PRACH configuration in the same manner even in the unlicensed band SCell on the basis of the PCell subframe index.

Alternatively, b-1) the terminal 310 may apply the FDD/TDD configuration for the licensed band on the basis of the first DL subframe index acquired by the base station 320 in the SCell, or b-2) the terminal 310 may additionally receive the FDD/TDD configuration having the licensed band but the same format and apply the FDD/TDD configuration on the basis of the first DL subframe index acquired by the base station 320 in the SCell, or b-3) the terminal 310 additionally receive the PRACH configuration for the unlicensed band only and apply the PRACH configuration on the basis of the first DL subframe index acquired by the base station 320 in the SCell.

Alternatively, c-1) the terminal 310 may apply the FDD/TDD configuration for the licensed band on the basis of the first UL subframe after the final DL subframe index acquired by the base station 320 in the SCell, or c-2) the terminal 310 may additionally receive the FDD/TDD configuration having the licensed band but the same format and apply the FDD/TDD configuration on the basis of the first UL subframe after the final DL subframe index acquired by the base station 320 in the SCell, or c-3) the terminal 310 additionally receive the PRACH configuration for the unlicensed band only and apply the PRACH configuration on the basis of the first UL subframe after the final DL subframe index acquired by the base station 320 in the SCell.

Alternatively, d-1) the terminal 310 may apply the FDD/TDD configuration for the licensed band in the same manner even in the unlicensed band SCell on the basis of the first PRACH subframe intended by the PDDCH order, d-2) the terminal 310 may additionally receive the FDD/TDD configuration having the different licensed band but the same format and apply the FDD/TDD configuration in the same manner even in the unlicensed band SCell on the basis of the first PRACH subframe intended by the PDDCH order, or a-3) the terminal 310 may additionally receive the PRACH configuration for the unlicensed band only and apply the PRACH configuration in the same manner even in the unlicensed band SCell on the basis of the first PRACH subframe intended by the PDDCH order.

Alternatively, e-1) the terminal 310 may apply the FDD/TDD configuration for the licensed band in the same manner even in the unlicensed band SCell on the basis of the first UL LBT subframe indicated by the common DCI, e-2) the terminal 310 may additionally receive the FDD/TDD configuration having the different licensed band but the same format and apply the FDD/TDD configuration in the same manner even in the unlicensed band SCell on the basis of the first UL LBT subframe indicated by the common DCI, or e-3) the terminal 310 may additionally receive the PRACH configuration for the unlicensed band only and apply the PRACH configuration in the same manner even in the unlicensed band SCell on the basis of the first UL LBT subframe indicated by the common DCI.

Alternatively, f-1) the terminal 310 may apply the FDD/TDD configuration for the licensed band in the same manner even in the unlicensed band SCell on the basis of the final UL LBT subframe within the MCOT indicated by the common DCI, f-2) the terminal 310 may additionally receive the FDD/TDD configuration having the different licensed band but the same format and apply the FDD/TDD configuration in the same manner even in the unlicensed band SCell on the basis of the final UL LBT subframe within the MCOT indicated by the common DCI, or f-3) the terminal 310 may additionally receive the PRACH configuration for the unlicensed band only and apply the PRACH configuration in the same manner even in the unlicensed band SCell on the basis of the final UL LBT subframe within the MCOT indicated by the common DCI.

Alternatively, g-1) the terminal 310 may apply the FDD/TDD configuration for the licensed band in the same manner even in the unlicensed band SCell on the basis of the final subframe within the MCOT indicated by the common DCI, g-2) the terminal 310 may additionally receive the FDD/TDD configuration having the different licensed band but the same format and apply the FDD/TDD configuration in the same manner even in the unlicensed band SCell on the basis of the final subframe within the MCOT indicated by the common DCI, or g-3) the terminal 310 may additionally receive the PRACH configuration for the unlicensed band only and apply the PRACH configuration in the same manner even in the unlicensed band SCell on the basis of the final subframe within the MCOT indicated by the common DCI.

Among the above-mentioned embodiments, the PRACH configuration for the unlicensed band may be at least one of the following options. i) Get the PRACH configuration for PCell, which is the licensed band, but ignore the configuration for the subframe. ii) Set N consecutive subframes as the PRACH subframe. iii) Set N consecutive subframes having m intervals notified by the PDCCH order as the PRACH subframe. iv) Set as all UL subframes indicated by the UL grant of the multi-subframe scheduling. iv) Set as a first subframe of all UL subframes indicated by the UL grant of the multi-subframe scheduling. iv) Set as a final subframe of all UL subframes indicated by the UL grant of the multi-subframe scheduling. vii) Identify and set the PRACH subframe among the N subframes by bitmap information included in the PDCCH order. viii) Set according to an instruction for one of the PRACH subframe information continuously or periodically composed of bitmap indicated by the SIB2 or the RRC message.

The terminal 310 receives the DRS based on the DRS configuration in the activated SCell and may consider the next subframe as the UL subframe as long as the PDCCH is not received. Further, the location of the PRACH resource intended by the PDCCH order is at that of the confirmed UL subframe or is not ahead of at least 6 subframes and if the terminal 310 is not assigned the DL or UL resource and may transmit the RAP in the UL subframe before the RAR timer has not expired.

RAR timer alignment: The base station 320 and the terminal 310 should have the same perception of the RAR timer. If the base station 320 instructs the terminal 310 to instruct the RAP transmission for the plurality of unlicensed band SCells by the PDCCH order, a plurality of RAR timers are operated. To address the problem, the following method is possible.

a) When the RAR timer is operated by one PDCCH order, if the RAP transmission is instructed by the new PDCCH order, the terminal 310 terminates the previous RAR timer and operates a new RAR timer.

b) When the RAR timer is operated by one PDCCH order, even if the RAP transmission is instructed by the new PDCCH order, the terminal 310 keeps and operates the previous RAR timer.

c) When the RAR timer is operated by one PDCCH order, if the RAP transmission is instructed by the new PDCCH order, the terminal 310 adds the new RAR timer value to the residual value of the previous RAR timer and is operated.

d) When the RAR timer is operated by one PDCCH order, if the RAP transmission is instructed by the new PDCCH order, the terminal 310 calculates the area corresponding to the union of the section indicated by the residual value of the previous RAR timer and the section indicated by the new RAR timer value and updates the RAR timer value to the value and is operated.

e) When the RAR timer is operating by one PDCCH order, if the RAP transmission is indicated by a new PDCCH order, the timer 310 is extended up to the first PRACH subframe indicated by the new PDCCH order and the new RAR timer is operated from the PRACH subframe. This is the same as operating the RAR timer updated immediately in the subframe receiving the PDCCH order by adding the remaining time up to the first PRACH subframe indicated by the new PDCCH order to the new RAR timer value.

Operation related to a delay of 6 ms when the terminal 310 receives the instruction of the plurality of PDCCH orders: According to the existing operation, the delay of 6 ms is minimally required until the RAP is transmitted at the time point when the PDCCH order is received. However, this takes into account the time when the terminal 310 is required to receive the PDCCH order, to understand the received information (about 3-4 ms), and to transmit the preamble to the indicated mask index. Therefore, if the same preamble is used, only a delay time (i.e., time when the terminal 310 receives the PDCCH order and checks the received information) of at least 3 to 4 ms may be considered. However, if different preambles are used every PDCCH order, a delay of 6 ms will be required as well. If the PDCCH order is transmitted every different ccs, the following operations of the terminal 310 may be defined.

a) If before one RAR timer expires in the cell belonging to the same timing advance group (TAG) or the same random access group (RAG), a new PDCCH order is indicated for the cell and is the same as the preamble ID indicated by the previous PDCCH order, the terminal 310 may transmit the RAP to the base station 320 after a reduced delay time (e.g., 3 ms).

b) If before one RAR timer expires in the cell belonging to the same TAG or the same RAG, the new PDCCH order is indicated for the cell and is different from the preamble ID indicated by the previous PDCCH order, the terminal 310 may transmit the RAP to the base station 320 after a normal delay time (e.g., 6 ms).

c) When the RA procedure is in progress by PDCCH order in TAG 1 or RAG 1, if a new PDCCH order is indicated for a cell belonging to another TAG 2 or RAG 2 and is the same as the preamble ID indicated by the previous PDCCH order, the terminal 310 may transmit the RAP to the base station 320 after the normal delay time (e.g., 6 ms). At this time, the previous RA procedure is maintained in TAG1 or RAG1.

d) When the RA procedure is in progress by PDCCH order in TAG 1 or RAG 1, if a new PDCCH order is indicated for a cell belonging to another TAG 2 or RAG 2 and is different from the preamble ID indicated by the previous PDCCH order, the terminal 310 may transmit the RAP to the base station 320 after the normal delay time (e.g., 6 ms). At this time, the previous RA procedure ends.

Operation related to a delay of 6 ms when the terminal 310 receives the instruction of one PDCCH order: A method of transmitting, by a terminal 310, RAP to a plurality of ccs by one PDCCH order may be considered in order to reduce a delay. According to the existing method, one PDCCH order may instruct the terminal 310 to provide cc intended by the base station by a CIF. If the new PDCCH order format is used, the base station 320 may directly instruct the plurality of ccs and their order to transmit the RAP to the terminal 310 in parallel. If the existing PDCCH order format is reused, the terminal 310 may perform the parallel RAP transmission in order for the activated cc within the TAG or RAG according to a predefined or RRC configurable rule. If the PRACH configuration for each cc is possible, the terminal 310 may selectively perform the RAP transmission only for the cc for which the PRACH configuration is completed. Meanwhile, it should be defined whether the terminal 310 performing the RAP transmission in one cc starts the RAP transmission in the next cc. The options for the procedure may include at least one of the following. a) The terminal 310 tries to transmit the RAP transmission for the fastest PRACH resource set in one cc and moves to the cc of the just next order to prepare the RAP transmission. b) If the LBT for the RAP transmission fails in one cc, the terminal 310 moves to the cc in the just next order and prepares for RAP transmission. c) If the RAP transmission starts in one cc and the set timer expires, the terminal 310 moves to the cc in the next order and prepares for the RAP transmission. d) If the RAP transmission starts in one cc and the LBT try fails k times, the terminal 310 moves to the cc in the next order and prepares for RAP transmission. e) If the RAP transmission starts in one cc and all the possible PRACH resources instructed by one PRACH configuration fails, the terminal 310 moves to the cc in the next order and prepares for the RAP transmission. e) If the terminal 310 tries to transmit the RAP transmission in the earliest next PRACH resource among the plurality of ccs and is assigned the PRACH resource in the same subframe in the plurality of ccs, it tries the RAP transmission in the cc having the lowest SCell index.

If there is one MAC instance for the plurality of PDCCH orders:

a) Only the preamble ID and the mask index indicated by the PDCCH order among the previous RAP transmission variables (e.g., preamble ID, mask index, RAR window, backoff index, maximum retry number, etc.) are updated to the contents of the new PDCCH order, and other variables may be maintained.

b) The preamble ID and the mask index indicated by the PDCCH order among the previous RAP transmission variables (e.g., preamble ID, mask index, RAR window, backoff index, maximum retry number, etc.) are updated to the contents of the new PDCCH order, and the RAR window may also start newly. The backoff index and the maximum retry number may be maintained.

c) The preamble ID and the mask index instructed by the PDCCH order among the previous RAP transmission variables (e.g., preamble ID, mask index, RAR window, backoff index, the maximum retry number, etc.) are updated to the contents of the new PDCCH order, and the RAR window and the maximum retry number may start newly. The backoff index may be maintained.

d) The preamble ID and the mask index indicated by the PDCCH order among the previous RAP transmission variables (e.g., preamble ID, mask index, RAR window, backoff index, maximum retry number, etc.) are updated to the contents of the new PDCCH order, and all the remaining variables may also be updated and initialized.

If there are a plurality of MAC instances for the plurality of PDCCH orders: If the new PDCCH order is received, a) Copy and operate the remaining parameters except the preamble ID, the mask index among the RAP transmission parameters of the previous PDCCH order.

b) Copy and operate the remaining parameters except the preamble ID, the mask index, and the RAR window among the RAP transmission parameters of the previous PDCCH order.

c) Copy and operate the remaining parameters except the preamble ID, the mask index, the RAR window, and the maximum retry number among the RAP transmission parameters of the previous PDCCH order.

d) Operate depending on all parameters of the new PDCCH order without copying the RAP transmission parameter of the previous PDCCH order.

Meanwhile, when the RA process including RAP and RAR is performed in parallel on the plurality of PDCCH orders, if the terminal 310 succeeds in receiving any one of the RARs, the remaining RA process may be terminated.

[HARQ-ACK/NACK Report Method]

In order to overcome the failure due to the LBT operation in the unlicensed band and successfully transmit the HARQ-ACK/NACK signal, there is a need to increase the success probability by trying the LBT several times to assign a plurality of redundant resources and to perform the HARQ-ACK/NACK signal. To this end, the base station 320 may assign 1) the HARQ-ACK resource to the terminal 310 in a plurality of ccs or 2) the HARQ-ACK resource to the plurality of subframes.

In the case of 1) the method for assigning the HARQ-ACK resource in the plurality of ccs, according to the embodiment, a fixed delay of 4 ms between the DL data and the HARQ-ACK may be maintained. However, 1-a) the terminal 310 may try the LBT in the plurality of ccs and transmit all the HARQ-ACK in the succeeding cc, but in this case, if all succeed in the ccs larger than 3, it may not be transmitted simultaneously due to the implementation limitation of the terminal 310. Therefore, the HARQ-ACK is transmitted only from cc having the lowest index to the maximum possible number of ccs, among the succeeding ccs and the HARQ-ACK signal may not be deliberately transmitted in the exceeding cc. In this case, the cc that does not deliberately transmit a signal may be considered as if the LBT fails. That is, if the terminal 310 performs the LBT result report operation, it may report the data assigned to the subframe that does not transmit the signal on purpose, including information on the LBT failure. According to another embodiment, 1-b) the terminal 310 may try the LBT in the plurality of ccs and may transmit the HARQ-ACK only in one of the succeeding ccs. In this case, in order for the base station 320 to identify the HARQ-ACK for the DL data in a certain cc, the terminal 310 may transmit the HARQ-ACK signal using the UCI format 3 which may express HARQ-ACK for up to five ccs. The five ccs of the format 3 represent the SCells sequentially increasing from the SCell index having a lower order within one UCI cell group. According to one embodiment, one of the five HARQ-ACKs of the format 3 is assigned for the LBT result report and the remaining may be assigned to the HARQ-ACK for four ccs.

In the case of the 2) method for assigning HARQ-ACK resources to a plurality of subframes, the case where the HARQ-ACK resources are assigned to a plurality of subframes that are consecutive in time for minimizing the delay may be considered first. According to one embodiment, when the LBT fails in the first two subframes when four consecutive UL subframes corresponding to four DL subframes are assigned to maintain a delay of 4 ms from each DL subframe, if the LBT fails in the first two subframes, the terminal 310 may collect and transmit the HARQ-ACKs, that have to be transmitted in the first and second subframes, in the third subframe. To this end, in order for the base station 320 to identify the HARQ-ACK for the DL data in a certain subframe, the terminal 310 may transmit the HARQ-ACK signal using the UCI format 3 which may express the HARQ-ACK for up to five ccs. The five HARQ-ACKs of the format 3 may sequentially correspond to the consecutive UL subframes assigned as the multi-subframes. According to one embodiment, one of the five HARQ-ACKs of the format 3 is assigned for the LBT result report and the remaining may be assigned as the HARQ-ACK for four subframes.

CSI Report Method

Unlike the HARQ-ACK, the channel state information (CSI) report is somewhat free from the limitations of performing the report after a fixed time interval compared to the subframe receiving the DL data. Thus, as if the CSI resource is periodically assigned to the existing PUCCH, the CSI resource may be assigned to potential periodical location in the unlicensed band SCell. The existing CSI report period may be set depending on CQI/precoding matrix indicator (PMI), and rank indication (RI), and according to FDD and TDD. In the same way, the base station 320 may set the report location to the terminal 310, but may not set the LBT. The terminal 310 may transmit the CSI report to the base station 320 in the resource only when the resource is made by the UL grant and the allocated resource matches the periodic report location. The location of the frequency resource block in the subframe may be indicated in advance according to the CSI report setting. The terminal 310 may transmit the CSI report information to the base station 320 in the UCI multiplexing scheme if data are transmitted from the PUSCH resource to the UL-shared channel (UL-SCH) notwithstanding that the UCI report transmission is not specified in the UL grant separately. Meanwhile, since the report fails depending on the LBT result, in order to overcome the problem, a) the terminal 310 may report the CSI in all assigned subframes, or b) the terminal 310 may also perform the CSI report in the subframe of the report location and in the multi-subframe assigned thereafter.

Meanwhile, according to the embodiment, the terminal 310 may also determine the potential LBT location depending on the configuration by the RRC message for the CSI report. If the terminal 310 determines various LBT locations depending on the CQI/PMI and RI report period settings to assign the multi-subframe by the UL grant, the terminal 310 may know in which subframe in the multi-subframe the LBT needs to be performed.

Figure 21:
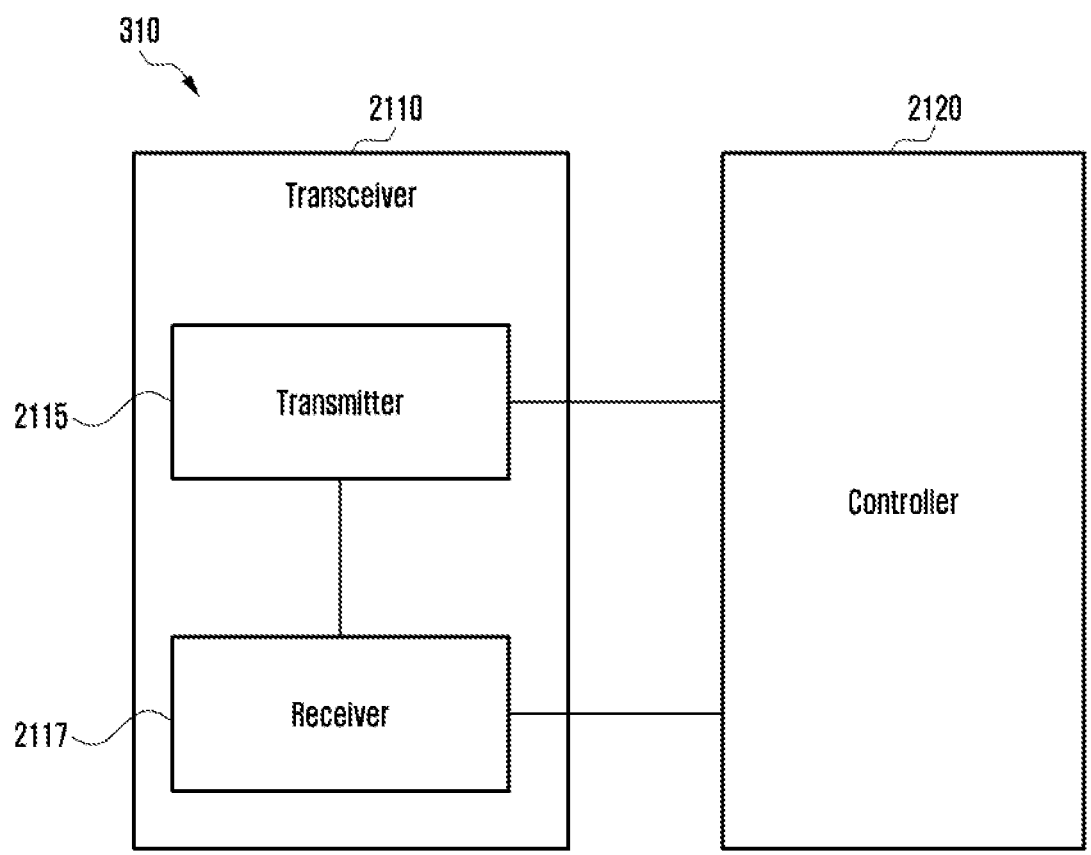
FIG. 21 is a diagram illustrating a configuration of a terminal according to an embodiment of the present disclosure.

FIG. 21 is a diagram illustrating a configuration of the terminal according to an embodiment of the present disclosure.

Referring to FIG. 21, the terminal 310 according to one embodiment of the present disclosure may include a transceiver 310 and a controller 2120 controlling the overall operation of the terminal 310. Further, the transceiver 2110 may include a transmitter 2115 and a receiver 2117.

The transceiver 2110 may transmit and receive a signal to and from other network entities.

The controller 2120 may control the terminal 310 to perform any one operation of the above-described embodiments. For example, the controller 2120 may perform a control to receive from the base station 320 the resource assignment information including the information indicating at least two consecutive uplink subframes that may communicate through the unlicensed band, check whether at least one of the at least two consecutive uplink subframes is occupied, and if it is determined that the at least one uplink subframe is occupied, transmit the uplink data to the base station 320 during the at least uplink subframe.

Meanwhile, the controller 2120 and the transceiver 2110 are not necessarily implemented as a separate module but may be implemented as one component in a form like a single chip. Further, the controller 2120 and the transceiver 2110 may be electrically connected to each other.

Further, for example, the controller 2120 may be a circuit, an application-specific circuit, or at least one processor. In addition, the operations of the terminal 310 may be realized by including a memory device storing the corresponding program code in any component of the terminal. That is, the controller 2120 may execute the above-described operations by reading and executing the program code stored in the memory device by a processor, a central processing unit (CPU) or the like.

Figure 22:
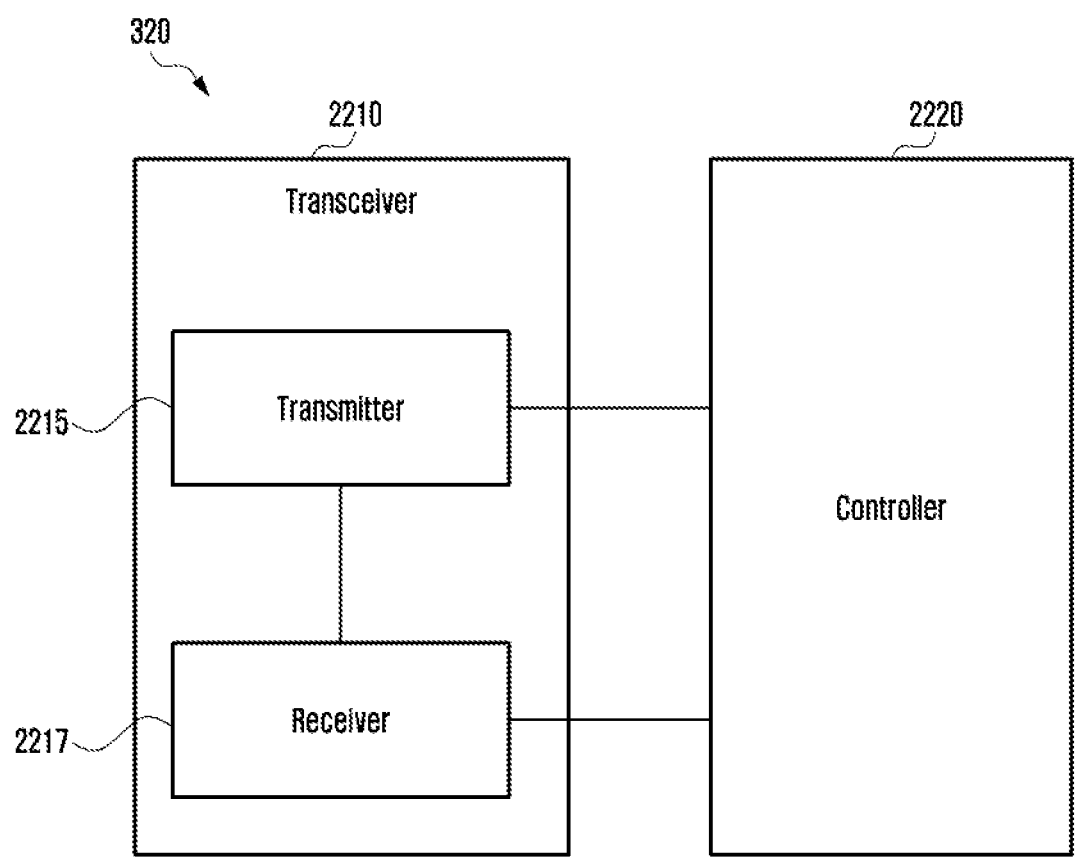
FIG. 22 is a diagram illustrating a configuration of a base station according to an embodiment of the present disclosure.

FIG. 22 is a diagram illustrating a configuration of the base station according to an embodiment of the present disclosure.

Referring to FIG. 22, the base station 320 according to one embodiment of the present disclosure may include a transceiver 2210 and a controller 2220 controlling the overall operation of the terminal 310. Further, the transceiver 2210 may include a transmitter 2215 and a receiver 2217.

The transceiver 2210 may transmit and receive a signal to and from other network entities.

The controller 2220 may control the base station 320 to perform any one operation of the above-described embodiments. For example, the controller 2220 may perform a control to generate resource assignment information including information of an uplink burst including at least two consecutive uplink subframes that may communicate through the unlicensed band, transmit the resource assignment information to the terminal 310, and receive the uplink data from the terminal 310 during the at least two consecutive UL subframes.

Meanwhile, the controller 2220 and the transceiver 2210 are not necessarily implemented as a separate module but may be implemented as one component in a form like a single chip. Further, the controller 2220 and the transceiver 2210 may be electrically connected to each other.

Further, for example, the controller 2220 may be a circuit, an application-specific circuit, or at least one processor. In addition, the operations of the base station 320 may be realized by including a memory device storing the corresponding program code in any component of the UE. That is, the controller 2220 may execute the above-described operations by reading and executing the program code stored in the memory device by a processor, a CPU or the like.

It should be noted that the examples of the methods and apparatuses illustrated by FIGS. 1 to 22 are not intended to limit the scope of the present disclosure. That is, it should not be construed that all the components, entities, or operations described in FIGS. 1 to 22 described above are indispensable elements for carrying out the disclosure, but they may be implemented within a range departing from the subject of the present disclosure even when the present disclosure includes only some components.

The operations of the base station 320 and the terminal 310 described above may be realized by including the memory device storing the corresponding program code in any component in the base station 320 or the terminal 310. That is, the controller 2120 of the base station 320 or the controller 2220 of the terminal 310 may execute the above-described operations by reading and executing the program code stored in the memory device by the processor and the CPU.

Various components, modules, etc., of the entity, the base station 320, or the terminal 310 described herein may also be operated using hardware circuits, for example, a complementary metal oxide semiconductor (CMOS) based logic circuit, hardware circuits such as firmware, software, and/or a combination of the hardware and the firmware and/or software embedded in a machine-readable medium. For example, various electrical structures and methods may be performed using electrical circuits such as transistors, logic gates, and an application-specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of a base station, the communication method comprising:
   generating semi-persistent scheduling (SPS) configuration information for an unlicensed band comprising resource assignment information of an uplink burst including at least two uplink subframes of the unlicensed band;
   transmitting, to a terminal, the SPS configuration information;
   transmitting, to the terminal, an indication for activating an SPS transmission;
   determining whether uplink data is received on the at least two uplink subframes of the uplink burst;
   increasing a counter for releasing the SPS transmission of the terminal, in case that the uplink data is not received on the at least two uplink subframes of the uplink burst;
   skipping an increase of the counter for releasing the SPS transmission of the terminal, in case that the uplink data is received on at least one of the at least two uplink subframes of the uplink burst;
   determining whether the counter reaches a maximum value;
   determining whether a keep alive message is received from the terminal in case that the counter reaches the maximum value, wherein the keep alive message indicates maintaining the SPS transmission in case that the terminal has the uplink data to be transmitted and the at least one uplink subframe of the at least two uplink subframes of the unlicensed band is not idle;
   releasing the SPS transmission, in case that the counter reaches the maximum value and the keep alive message is not received; and
   maintaining the SPS transmission to enable receiving the uplink data from the terminal and initializing the counter, in case that the counter reaches the maximum value and the keep alive message is received.

2. The communication method of claim 1, wherein the resource assignment information further includes information of at least two uplink bursts.

3. The communication method of claim 2, wherein the resource assignment information further includes information of a number of the at least two uplink bursts and a number of uplink subframes included in each of the at least two uplink bursts.

4. The communication method of claim 1,
   wherein the uplink burst includes at least two consecutive uplink subframes of the unlicensed band, and
   wherein the resource assignment information further includes information of a set of uplink bursts comprising a first uplink burst and a second uplink burst that are consecutive.

5. A communication method of a terminal, the communication method comprising:
   receiving, from a base station, semi-persistent scheduling (SPS) configuration information for an unlicensed band comprising resource assignment information of an uplink burst including at least two uplink subframes of the unlicensed band;

receiving, from the base station, an indication for activating an SPS transmission;
determining whether uplink data to be transmitted exists;
determining whether at least one uplink subframe of the at least two uplink subframes of the uplink burst is idle, in case that the uplink data to be transmitted exists;
transmitting, to the base station, the uplink data on the at least one uplink subframe of the uplink burst and skipping an increase of a counter for releasing the SPS transmission of the terminal, in case that the at least one uplink subframe of the at least two uplink subframes of the uplink burst is idle and the uplink data to be transmitted exists;
increasing the counter for releasing the SPS transmission of the terminal, in case that the at least two uplink subframes of the uplink burst is idle or the uplink data to be transmitted does not exist; and
transmitting, to the base station, a keep alive message for maintaining the SPS transmission, in case that the at least one uplink subframe of the at least two uplink subframes of the uplink burst is not idle and the uplink data to be transmitted exist.

6. The communication method of claim 5, wherein the resource assignment information further includes information of at least two uplink bursts, information of a number of the at least two uplink bursts, and a number of uplink subframes included in each of the at least two uplink bursts.

7. The communication method of claim 5,
wherein the uplink burst includes at least two consecutive uplink subframes of the unlicensed band, and
wherein the resource assignment information further includes information of a set of uplink bursts comprising a first uplink burst and a second uplink burst that are consecutive.

8. A base station comprising:
a transceiver; and
at least one processor configured to:
    generate semi-persistent scheduling (SPS) configuration information for an unlicensed band comprising resource assignment information of an uplink burst including at least two uplink subframes of the unlicensed band,
    control the transceiver to transmit, to a terminal, the SPS configuration information,
    control the transceiver to transmit, to the terminal, an indication for activating an SPS transmission,
    determine whether uplink data is received on the at least two uplink subframes of the uplink burst,
    increase a counter for releasing the SPS transmission of the terminal, in case that the uplink data is not received on the at least two uplink subframes of the uplink burst,
    skip an increase of the counter for releasing the SPS transmission of the terminal, in case that the uplink data is received on at least one of the at least two uplink subframes of the uplink burst,
    determine whether the counter reaches a maximum value,
    determine whether a keep alive message is received from the terminal in case that the counter reaches the maximum value, wherein the keep alive message indicates maintaining the SPS transmission in case that the terminal has the uplink data to be transmitted and the at least one uplink subframe of the at least two uplink subframes of the unlicensed band is not idle,
    release the SPS transmission, in case that the counter reaches the maximum value and the keep alive message is not received, and
    maintain the SPS transmission to enable receiving the uplink data from the terminal and initializing the counter, in case that the counter reaches the maximum value and the keep alive message is received.

9. The base station of claim 8, wherein the resource assignment information further includes information of at least two uplink bursts.

10. The base station of claim 9, wherein the resource assignment information further includes information of a number of the at least two uplink bursts and a number of uplink subframes included in each of the at least two uplink bursts.

11. The base station of claim 8,
wherein the uplink burst includes at least two consecutive uplink subframes of the unlicensed band, and
wherein the resource assignment information further includes information of a set of uplink bursts comprising a first uplink burst and a second uplink burst that are consecutive.

12. A terminal comprising:
a transceiver; and
at least one processor configured to:
    control the transceiver to receive, from a base station, semi-persistent scheduling (SPS) configuration information for an unlicensed band comprising resource assignment information of an uplink burst including at least two uplink subframes of the unlicensed band,
    control the transceiver to receive, from the base station, an indication for activating an SPS transmission,
    determine whether uplink data to be transmitted occurs,
    determine whether at least one uplink subframe of the at least two uplink subframes of the uplink burst is idle, in case that the uplink data to be transmitted occurs,
    control the transceiver to transmit, to the base station, the uplink data on the at least one uplink subframe of the uplink burst and skip an increase of a counter for releasing the SPS transmission of the terminal, in case that the at least one uplink subframe of the at least two uplink subframes of the uplink burst is idle and the uplink data to be transmitted occurs,
    increase a counter for releasing the SPS transmission of the terminal, in case that the at least two uplink subframes of the uplink burst is idle or the uplink data to be transmitted does not occur, and
    control the transceiver to transmit, to the base station, a keep alive message for maintaining the SPS transmission, in case that the at least one uplink subframe of the at least two uplink subframes of the uplink burst is not idle and the uplink data to be transmitted occurs.

13. The terminal of claim 12, wherein the resource assignment information further includes the information of at least two uplink bursts.

14. The terminal of claim 13, wherein the resource assignment information further includes information of a number of the at least two uplink bursts and a number of uplink subframes included in each of the at least two uplink bursts.

15. The terminal of claim 12,
wherein the uplink burst includes at least two consecutive uplink subframes of the unlicensed band, and wherein the resource assignment information further includes information of a set of uplink bursts comprising a first uplink burst and a second uplink burst that are consecutive.

* * * * *